United States Patent
Yamada et al.

(10) Patent No.: US 9,679,673 B2
(45) Date of Patent: Jun. 13, 2017

(54) CONDUCTIVE COMPOSITION, CONDUCTOR AND SOLID ELECTROLYTIC CAPACITOR USING CONDUCTIVE COMPOSITION

(71) Applicant: MITSUBISHI RAYON CO., LTD., Chiyoda-ku (JP)

(72) Inventors: Kohei Yamada, Yokohama (JP); Takahiro Sakai, Yokohama (JP); Masashi Uzawa, Yokohama (JP); Youko Sasata, Yokohama (JP); Akira Yamazaki, Yokohama (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 15 days.

(21) Appl. No.: 14/941,756

(22) Filed: Nov. 16, 2015

(65) Prior Publication Data
US 2016/0078978 A1    Mar. 17, 2016

Related U.S. Application Data

(62) Division of application No. 14/111,847, filed as application No. PCT/JP2012/060741 on Apr. 20, 2012, now abandoned.

(30) Foreign Application Priority Data

Apr. 20, 2011  (JP) ................. 2011-094426
Apr. 20, 2011  (JP) ................. 2011-094427
(Continued)

(51) Int. Cl.
*H01G 9/02*    (2006.01)
*H01B 1/12*    (2006.01)
(Continued)

(52) U.S. Cl.
CPC ......... *H01B 1/128* (2013.01); *C08G 73/0266* (2013.01); *C08K 3/22* (2013.01);
(Continued)

(58) Field of Classification Search
CPC .................................................. H01G 9/025
(Continued)

(56) References Cited

U.S. PATENT DOCUMENTS 4,910,645 A    3/1990 Jonas et al.
5,484,884 A    1/1996 MacDiarmid et al.
(Continued)

FOREIGN PATENT DOCUMENTS

CN    101302339    11/2008
CN    101379138    3/2009
(Continued)

OTHER PUBLICATIONS

Sigma-Aldrich product literature page "2-Amino-4,6-dihydroxypyrimidine" http://www.sigmaaldrich.com/catalog/product/aldrich/a50401?lang=en&region=US.*
(Continued)

*Primary Examiner* — Khanh Tuan Nguyen
(74) *Attorney, Agent, or Firm* — Oblon, McClelland, Maier & Neustadt, L.L.P.

(57) ABSTRACT

A conductive composition according to the present invention contains a conductive polymer (A) having a sulfonic acid group and/or a carboxyl group; and an alkali metal hydroxide and/or an alkaline earth metal hydroxide (B). In such a conductive composition, the amount of the hydroxide (B) is set at 0.2~0.65 mol per 1 mol of a repeating unit that contains a sulfonic acid group and/or a carboxyl group in the conductive polymer (A).

18 Claims, 1 Drawing Sheet

(30) Foreign Application Priority Data

| | | |
|---|---|---|
| Jun. 10, 2011 | (JP) | 2011-129821 |
| Sep. 16, 2011 | (JP) | 2011-202830 |
| Sep. 16, 2011 | (JP) | 2011-202831 |
| Oct. 26, 2011 | (JP) | 2011-234842 |
| Jan. 13, 2012 | (JP) | 2012-005117 |

(51) Int. Cl.
  *C08G 73/02* (2006.01)
  *C08K 3/22* (2006.01)
  *H01G 9/15* (2006.01)
  *H01G 9/042* (2006.01)

(52) U.S. Cl.
  CPC ............. *H01B 1/124* (2013.01); *H01G 9/042* (2013.01); *H01G 9/151* (2013.01)

(58) Field of Classification Search
  USPC ........................................................ 361/525
  See application file for complete search history.

(56) References Cited

U.S. PATENT DOCUMENTS

| | | |
|---|---|---|
| 5,489,400 A | 2/1996 | Liu et al. |
| 5,589,108 A | 12/1996 | Shimizu et al. |
| 5,700,399 A | 12/1997 | Shimizu et al. |
| 5,821,344 A | 10/1998 | Chen et al. |
| 5,932,144 A | 8/1999 | Shimizu et al. |
| 5,993,694 A | 11/1999 | Ito et al. |
| 2005/0269555 A1 | 12/2005 | Lee et al. |
| 2007/0249803 A1 | 10/2007 | Mattes et al. |
| 2008/0308771 A1 | 12/2008 | Lee et al. |
| 2013/0012655 A1 | 1/2013 | Sakai et al. |
| 2015/0179295 A1 | 6/2015 | Yamada et al. |

FOREIGN PATENT DOCUMENTS

| | | | | |
|---|---|---|---|---|
| CN | 101643544 A | 2/2010 | | |
| EP | 0 813 212 A2 | 12/1997 | | |
| EP | 1 595 908 A1 | 11/2005 | | |
| EP | 2 551 290 A1 | 1/2013 | | |
| JP | 2 15611 | 1/1990 | | |
| JP | 6 293828 | 10/1994 | | |
| JP | 7 179578 | 7/1995 | | |
| JP | 7 196791 | 8/1995 | | |
| JP | 7 324132 | 12/1995 | | |
| JP | 9 22833 | 1/1997 | | |
| JP | 09-71643 | 3/1997 | | |
| JP | H 09-71643 A | * | 3/1997 | ............ C08G 73/00 |
| JP | 10 110030 | 4/1998 | | |
| JP | H 10-110030 | * | 4/1998 | ............ C08G 73/00 |
| JP | 10 259249 | 9/1998 | | |
| JP | 11 186110 | 7/1999 | | |
| JP | 2000-219739 | * | 8/2000 | ............ C08G 73/00 |
| JP | 2000 219739 | 8/2000 | | |
| JP | 2000 223364 | 8/2000 | | |
| JP | 2001 513126 | 8/2001 | | |
| JP | 2002-226721 | * | 8/2002 | ............ C08L 101/12 |
| JP | 2006-77229 A | 3/2006 | | |
| JP | 2010 20976 | 1/2010 | | |
| JP | 2010 111837 | 5/2010 | | |
| JP | 2010 116441 | 5/2010 | | |
| JP | 2010 202836 | 9/2010 | | |
| JP | 2011 26590 | 2/2011 | | |
| JP | 2011 116967 | 6/2011 | | |
| WO | WO 98/38224 | 9/1998 | | |
| WO | WO 2005/108465 A1 | 11/2005 | | |
| WO | 2011 024830 | 3/2011 | | |
| WO | 2011 118611 | 9/2011 | | |
| WO | 2012 057114 | 5/2012 | | |

OTHER PUBLICATIONS

International Search Report Issued Jun. 12, 2012 in PCT/JP12/060741 Filed Apr. 20, 2012.

European Search Report issued Dec. 10, 2014 in Patent Application No. 12774801.0.

B. L. Rivas, et al., "Poly(2-) and (3-aminobenzoic acids) and Their Copolymers with Aniline: Synthesis, Characterization, and Properties" Journal of Applied Polymer Science, vol. 89, XP 002560263, 2003, pp. 2641-2648.

International Search Report Issued Jan. 24, 2012 in PCT/JP11/74510 Filed Oct. 25, 2011.

Extended European Search Report issued Nov. 3, 2014 in Patent Application No. 11836247.4.

Office Action mailed Nov. 20, 2014, in co-pending U.S. Appl.No. 13/880,659.

Office Action issued on Feb. 9, 2016 in Japanese Patent Application No. 2012-523750 (with English language translation).

Urben, Peter G., "Bretherick's Handbook of Reactive Chemical Hazards", vols. 1-2, (7th Edition), p. 191 (2007).

* cited by examiner

CONDUCTIVE COMPOSITION, CONDUCTOR AND SOLID ELECTROLYTIC CAPACITOR USING CONDUCTIVE COMPOSITION

The present invention relates to a conductive composition, and to a conductor and a solid electrolytic capacitor formed using the conductive composition. This application is a division of U.S. patent application Ser. No. 14/111,847, filed Oct. 15, 2013, now pending; which is the U.S. national stage of International Patent Application No. PCT/JP2012/060741, filed Apr. 20, 2012, the disclosures of which are incorporated herein by reference in their entireties. This application claims priority benefit of Japanese Patent Applications Nos. 2011-094426 and 2011-094427, filed Apr. 20, 2011, Japanese Patent Application No. 2011-129821, filed Jun. 10, 2011, Japanese Patent Applications Nos. 2011-202830 and 2011-202831, filed Sep. 16, 2011, Japanese Patent Application No. 2011-234842, filed Oct. 26, 2011, and Japanese Patent Application No. 2012-005117, filed Jan. 13, 2012, the disclosures of which are incorporated herein by reference in their entireties.

TECHNICAL FIELD

Background Art

Regarding conductive polymers, polyaniline-based, polythiophene-based and poly(paraphenylene vinylene)-based conductive polymers are well known and used for various purposes. However, since those conductive polymers are not soluble in most solvents except for some polar aprotic solvents, problems may arise when they are molded or processed.

In addition, among those conductive polymers, polythiophene-based and poly(paraphenylene vinylene)-based conductive polymers have problems such as expensive raw material and a complex manufacturing process, although they have higher conductivity than polyaniline-based conductive polymers.

To solve such problems that may arise during a molding or manufacturing process and to achieve higher conductivity, proposed is a method for manufacturing aniline-based conductive polymers by polymerizing an acidic group-substituted aniline, such as a sulfonic acid group-substituted aniline or a carboxylic acid group-substituted aniline, using a solution containing a basic compound (see patent publications 1 and 2).

Aniline-based conductive polymers obtained by the above method have excellent solubility in various solvents in a wide range of pH from acidic to alkaline.

To enhance the conductivity and heat resistance of the above-described aniline-based conductive polymers, conventionally proposed methods are as follows.
(i) A method for producing highly refined and conductive aniline-based conductive polymers: When an acidic group-substituted aniline is polymerized in a solution containing a basic compound, impurities are less likely to be produced by dripping a solution containing the above acidic group-substituted aniline and a basic compound into an oxidation solution as a polymerization catalyst (patent publication 3).
(ii) A method for enhancing the heat resistance of a conductive composition containing an aniline-based conductive polymer by adding a basic compound to the conductive composition (patent publication 4).

In addition, the following methods are also proposed: a method for producing a conductive composition with a high content of sulfonic acid by adding an oxidant into a mixed solution of aniline and alkylsulfonic acid to carry out polymerization reactions so that alkylsulfonic acid is dispersed in a conductive polymer (patent publication 5); and a method for providing conductive film by adding a naphthalenediol derivative to a conductive polymer so that such a film can maintain conductivity without thermal treatment after the film is formed (patent publication 6).

A solid electrolyte capacitor is structured with porous layer formed by oxidizing a surface of metal foil or sintered metal made of valve metal such as aluminum, tantalum, niobium or the like, where the anodic oxide layer is used as the dielectric. The anodic oxide layer is in contact with an electrolyte, and the electrolyte works as a cathode to extract an electrode from the anodic oxide layer.

Also, since an electrolyte as a cathode has significant effects on the electrical characteristics of electrolytic capacitors, various types of electrolytes have been proposed for electrolytic capacitors. Conductive polymers such as poly(ethylenedioxythiophene) (PEDOT) or the like are widely used as solid electrolytes in solid electrolytic capacitors. Moreover, the following method is also known: By immersing a capacitor element in a mixed solution of an oxidation solution and a monomer solution, the capacitor element is impregnated with the oxidant and the monomer, and polymerization reactions of the oxidant and the monomer are accelerated to form a solid electrolyte on the anodic oxide layer of the capacitor element.

In addition, to enhance the conductivity of an electrolyte, a chemical oxidative polymerization method is used, where an oxidant and a dopant (conductive additive) are added to a monomer so that the monomer and the oxidant react directly on the anodic oxide layer to form a conductive polymer layer. As a manufacturing method, a chemical oxidative polymerization method (patent publication 7) is proposed, where EDOT, an oxidant and a dopant are dissolved in an organic solvent and react on the anodic oxide layer to form a conductive polymer layer.

In addition, to manufacture an electrolytic capacitor with lowered equivalent series resistance (hereinafter abbreviated as ESR), methods such as follows are proposed: forming a conductive polymer layer in a capacitor element by immersing a capacitor element in a solution containing a dopant and drying it, followed by dripping a monomer that becomes a conductive polymer through oxidation polymerization, and then by impregnating the capacitor element with an oxidation solution (patent publication 8); and forming an electrolytic capacitor by impregnating a capacitor element with an electrolytic solution and a conductive polymer containing a highly conductive dopant (patent publication 9).

Also proposed is a method for forming a conductive polymer layer by preparing a conductive polymer solution and by impregnating an anodic oxide layer with the solution, which is then dried to be a coating film (patent publication 10).

PRIOR ART PUBLICATION

Patent Publication

[Patent Publication 1] Japanese Laid-Open Patent Publication No. H7-196791
[Patent Publication 2] Japanese Laid-Open Patent Publication No. H7-324132
[Patent Publication 3] Japanese Laid-Open Patent Publication No. 2000-219739

[Patent Publication 4] Japanese Laid-Open Patent Publication No. 2010-116441
[Patent Publication 5] Japanese Laid-Open Patent Publication No. H7-179578
[Patent Publication 6] Japanese Laid-Open Patent Publication No. 2011-26590
[Patent Publication 7] Japanese Laid-Open Patent Publication No. H02-15611
[Patent Publication 8] Japanese Laid-Open Patent Publication No. 2000-223364
[Patent Publication 9] Japanese Laid-Open Patent Publication No. H11-186110
[Patent Publication 10] Japanese Laid-Open Patent Publication No. H09-22833

SUMMARY OF THE INVENTION

Problem(s) to be Solved by the Invention

However, using the manufacturing methods in patent publications 1 and 2, side reactions of a raw-material monomer such as azotized acidic group-substituted anilines are not sufficiently suppressed, and byproducts contained in polymer compounds have been causing lower conductivity. On the other hand, regarding conductive compositions obtained in methods (i) and (ii) described above, conductivity in a high-temperature atmosphere is still insufficient. Especially, to apply to a capacitor or the like, conductivity and heat resistance are preferred to be further improved.

The objective of the present invention is to provide a conductive composition with excellent conductivity and heat resistance as well as a conductor and a solid electrolytic capacitor using such a conductive composition.

Using the method above in which a solid electrolyte is polymerized on an anodic oxide layer, it is difficult to form a conductive polymer layer all the way into minutely roughened portions of the anodic oxide layer, while a dopant contained in the conductive polymer layer tends to be desorbed from the conductive polymer layer into the electrolytic solution (dedoping phenomenon), thus causing problems such as a reduction in electrical conductivity in the conductive polymer layer and a gradual increase of ESR.

On the other hand, regarding the method for forming a coating film by preparing in advance a conductive polymer solution containing an acidic group to become a dopant in the molecule, it simplifies the process compared with polymerization on an anodic oxide layer, but it is difficult to obtain conductive polymers with excellent properties, and the same problems as above remain.

In addition, conductivity under a high-temperature atmosphere is still insufficient, and further improvement in conductivity and heat resistance is preferred if such a method is to apply to a capacitor or the like.

Solution(s) to the Problem(s)

The inventors of the present invention have found that when a specific compound is added to a conductive polymer containing a sulfonic acid group and/or a carboxyl group, significant improvement is noted in conductivity and heat resistance in the obtained composition.

Also, the inventors of the present invention have found that when the above conductive polymer is a soluble aniline-based conductive polymer having a repeating unit shown in general formula (1) below, the method for manufacturing a capacitor is simplified because such a conductive polymer is highly soluble in water, an organic solvent or a hydrous organic solvent, and because a doping process is not required after the coating film is formed.

Furthermore, the inventors have found that when a soluble aniline-based conductive polymer having a repeating unit shown in general formula (1) below and a compound containing at least two carboxylic acids or their salts in the same molecule are added as solid electrolytes, the conductivity of the obtained composition significantly improves, and that a solid electrolytic capacitor with excellent heat resistance and high capacitance is obtained by using such a composition.

Namely, embodiments of the present invention are as follows.

A first embodiment of the present invention is a conductive composition that contains conductive polymer (A) having a sulfonic acid group and/or a carboxyl group as well as alkali metal hydroxide and/or alkaline earth metal hydroxide (B); and the amount of hydroxide (B) is 0.2~0.65 mol per repeating unit containing the sulfonic acid group and/or carboxyl group in conductive polymer (A).

A second embodiment of the present invention is a conductive composition that contains conductive polymer (A) having a sulfonic acid group and/or a carboxyl group as well as at least one compound (C) selected from among acetates, carbonates, phosphates and halides of alkali metals and/or alkaline earth metals.

A third embodiment of the present invention is a conductive composition that contains conductive polymer (A) having a sulfonic acid group and/or a carboxyl group as well as compound (D) which contains a basic group and at least two hydroxy groups in the same molecule and whose melting point is 30° C. or higher.

A fourth embodiment of the present invention is a conductive composition that contains conductive polymer (A) having a sulfonic acid group and/or a carboxyl group as well as compound (E) containing at least one each of a basic group and an acidic group in the same molecule.

A fifth embodiment of the present invention is a conductive composition that contains conductive polymer (A) having a sulfonic acid group and/or a carboxyl group as well as compound (F) containing at least two carboxylic acids or their salts in the same molecule.

A sixth embodiment of the present invention is a conductive composition described in any one of the first to fifth embodiments above, where the above conductive polymer (A) has a repeating unit as shown in general formula (1).

[Chemical Formula 1]

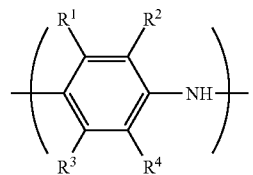

(1)

(In formula (1), $R^1$~$R^4$ are each independently referred to as a hydrogen atom, a linear or branched alkyl group having 1~0.24 carbon atoms, a linear or branched alkoxy group having 1~24 carbon atoms, an acidic group, a hydroxyl group, a nitro group or a halogen atom. In addition, at least one of $R^1$~$R^4$ is an acidic group or its salt.)

A seventh embodiment of the present invention is a conductive composition described in any one of the first to sixth embodiments above, in which the conductive polymer has an area ratio (X/Y) of 1.20 or greater, calculated by an analytical method that includes steps (I)~(VI) below.

(I) A step for preparing a test solution by dissolving a conductive polymer at a solid concentration of 0.1% by mass in an eluent prepared to have a pH value of 10 or greater.

(II) A step for measuring the molecular-weight distribution of the test solution by gel permeation chromatography using a polymer material analysis instrument so that a chromatogram is obtained.

(III) Based on the chromatogram obtained in step (II) above, a step for converting the retention time to molecular weight (M) in terms of sodium polystyrene sulfonate.

(IV) A step for determining area (X) of a region where molecular weight (M) in terms of sodium polystyrene sulfonate is 15000 Da or greater.

(V) A step for determining area (Y) of a region where molecular weight (M) in terms of sodium polystyrene sulfonate is less than 15000 Da.

(VI) A step for calculating area ratio (X/Y) of area (X) to area (Y).

An eighth embodiment of the present invention is a conductor formed by using a conductive composition described in any one of the first to seventh embodiments above.

A ninth embodiment of the present invention is a solid electrolytic capacitor formed by using a conductive composition described in any one of the first to seventh embodiments above.

Effect(s) of the Invention

According to the embodiments of the present invention, conductive compositions with excellent conductivity, heat resistance and film formability are obtained.

In addition, according to an embodiment of the present invention, a solid electrolytic capacitor is manufactured to have a conductive polymer layer with high capacitance (electrical capacitance) and conductivity along with excellent heat resistance.

MODE TO CARRY OUT THE INVENTION

Figure 1:
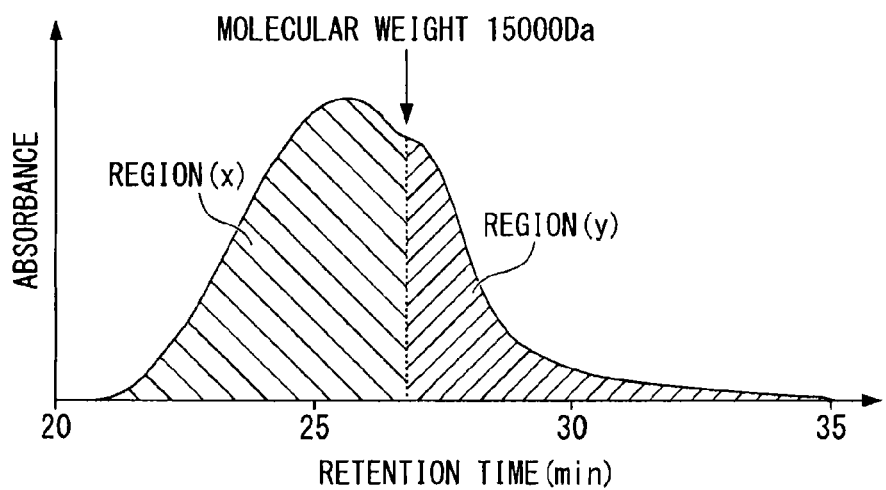
FIG. 1 is an example of a chromatogram obtained by gel permeation chromatography in step (II) of the analytical method.

In the following, embodiments of the present invention are described in detail.

In the embodiments, "soluble" means 0.1 gram or more of a polymer is dissolved homogeneously in 10 grams of water, water containing a base and a basic salt, water containing an acid, solvents such as methyl alcohol, ethyl alcohol and isopropyl alcohol, or a mixture thereof (each at liquid temperature of 25° C.).

Also, "conductivity" means volume resistivity of $10^9$ Ω·cm or less (electrical conductivity of $10^{-9}$ S/cm or greater). In addition, "molecular weight (M)" means weight-average molecular weight (Mw).

Furthermore, in the embodiments of the present invention, "acidic groups" mean sulfonic acid groups or carboxyl groups. Sulfonic acid groups and carboxyl groups may each be contained in the form of acid ($-SO_3H$, $-COOH$) or in the form of ions ($-SO_3-$, $-COO-$).

<Conductive Polymer (A)>

As a composition described in the embodiments of the present invention, conductive polymer (A) having a sulfonic acid group and/or a carboxyl group is not limited to any specific type. Any well-known conductive polymer may be used.

More specifically, conductive polymers having the following groups are listed: a sulfonic acid group and/or a carboxyl group and their alkali metal salts, ammonium salts and substituted ammonium salts; and an alkyl group or an alkyl group with an ether bond, substituted by a sulfonic acid group and/or a carboxyl group and their alkali metal salts, ammonium salts and substituted ammonium salts. Such groups are positioned on the skeletal formula or on a nitrogen atom of at least one π-conjugated polymer selected from polyphenylene vinylene, polyacetylene, polythiophene, polypyrrole, polyaniline, poly(isothianaphthene), polyfuran, polycarbazole, polydiaminoanthraquinone and polyindole, which are unsubstituted or substituted.

Among those above, conductive polymers having the skeletal formula of polythiophene, polypyrrole, polyaniline, polyphenylene vinylene or poly(isothianaphthene) are preferred. Especially preferred is such a conductive polymer that contains at least one type of repeating unit, selected from among those as shown in general formulas (2)~(4) below, at 20~100 mol % relative to the total number of repeated units in the entire conductive polymer.

[Chemical Formula 2]

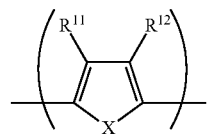

(2)

[Chemical Formula 3]

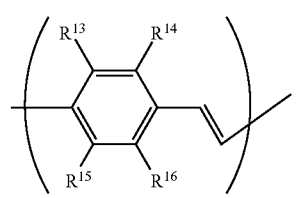

(3)

[Chemical Formula 4]

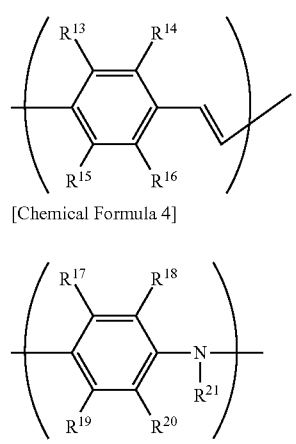

(4)

In general formulas (2)~(4) above, (X) indicates a sulfur atom or a nitrogen atom, and $R^{11}$~$R^{21}$ each independently show a group selected from among the following: hydrogen atom, halogen atom, $-SO_3H$, $-R^{61}SO_3H$, $-OCH_3$, $-CH_3$, $-C_2H_5$, $-F$, $-Cl$, $-Br$, $-I$, $-N(R^{60})_2$, $-NHCOR^{60}$, $-OH$, $-O-$, $-SR^{60}$, $-OR^{60}$, $-OCOR^{60}$, $-NO_2$, $-COOH$, $-R^{61}COOH$, $-COOR^{60}$, $-COR^{60}$, $-CHO$, and $-CN$. Here, $R^{60}$ is an alkyl group having 1~24 carbon atoms, allyl group or aralkyl group, and $R^{61}$ is an alkylene group, arylene group or aralkylene group.

However, regarding $R^{11}\sim R^{12}$ in general formula (2), $R^{13}\sim R^{16}$ in general formula (3) and $R^{17}\sim R^{21}$ in general formula (4), at least one of them is selected from among the following: $-SO_3H$, $-R^{61}SO_3H$, $-COOH$, $-R^{61}COOH$ or their respective alkali metal salts, ammonium salts and substituted ammonium salts.

Considering conductivity and solubility, conductive polymers (A) used in the embodiments of the present invention are preferred to have a repeating unit shown in general formula (1) below.

[Chemical Formula 5]

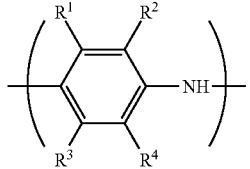

(1)

In formula (1), $R^1\sim R^4$ are each independently a hydrogen atom, linear or branched alkyl group having 1~24 carbon atoms, linear or branched alkoxy group having 1~24 carbon atoms, acidic group, hydroxyl group, nitro group or halogen atom ($-F$, $-Cl$, $-Br$ or I), and at least one of $R^1\sim R^4$ is an acidic group or its salt. The amount of a basic compound of such a salt is 0.1% by mass or less.

Here, when the amount of the basic compound above is 0.1% by mass or less, conductive polymer (A) exhibits high conductivity.

Here, "acidic group" indicates a sulfonic acid group or a carboxyl group. Sulfonic acid groups and carboxyl groups may each be contained in the form of acid ($-SO_3H$, $-COOH$) or in the form of ions ($-SO_3-$, $-COO-$).

In addition, "salt" means at least one of an alkali metal salt, alkaline earth metal salt, ammonium salt or substituted ammonium salt.

Regarding a repeating unit shown as general formula (1), it is preferred that any one of $R^1\sim R^4$ be a linear or branched alkoxy group having 1~4 carbon atoms, any one of the rest be a sulfonic acid group, and the rest be hydrogen because they are easy to manufacture.

Among all the repeating units in the conductive polymer (100 mol %), the repeating unit shown in general formula (1) above is preferred to be contained at 10~100 mol %, more preferably at 50~100 mol %, in the conductive polymer. Being contained at 100 mol % is especially preferred, since excellent solubility in water or organic solvents is achieved regardless of its pH.

Also, when considering excellent conductivity, at least 10 units of the repeating unit shown in general formula (1) are preferred to be contained in the same molecule of the conductive polymer.

To enhance solubility, it is preferred that soluble aniline-based conductive polymers according to the embodiments of the present invention contain 70% or greater of an acidic group, more preferably 80% or greater, and even more preferably 90% or greater, relative to the repeating unit, namely aromatic ring, shown in general formula (1) above. Here, if the proportion of an acidic group relative to the aromatic ring is 70% or less, it is not preferable since its solubility in water is insufficient. Also, the higher the proportion of an acidic group to the aromatic ring, the higher the solubility. Accordingly, such conductive polymers are suitable for manufacturing a capacitor.

In addition, regarding the units in the conductive polymer other than the unit shown in general formula (1) above, as long as the polymer's solubility, conductivity and other properties are not affected, it is an option to contain at least one of the following units: substituted or unsubstituted anilines, thiophene, pyrrole, phenylene, vinylene, divalent unsaturated groups and divalent saturated groups.

As conductive polymer (A), compounds having the structure shown in general formula (5) below are preferred.

[Chemical Formula 6]

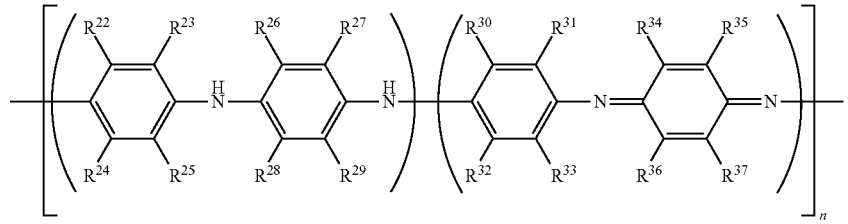

(5)

In formula (5), $R^{22}\sim R^{37}$ are each independently a hydrogen atom, linear or branched alkyl group having 1~4 carbon atoms, linear or branched alkoxy group having 1~4 carbon atoms, acidic group, hydroxyl group, nitro group or halogen ($-F$, $-Cl$, $-Br$ or I), and at least one of $R^{22}\sim R^{37}$ is an acidic group. In addition, (n) indicates the degree of polymerization.

Among the compounds having the structure shown in general formula (5) above, poly(2-sulfo-5-methoxy-1,4-iminophenylene) is especially preferred because of its excellent solubility.

The weight-average molecular weight of a conductive polymer is preferred to be 3000~4000000, and more preferably 3000~50000. If the weight-average molecular weight of the conductive polymer is 3000 or greater, conductivity, film formability and film strength are excellent. Likewise, if the weight-average molecular weight of the conductive polymer is 1000000 or less, the solubility in solvents is excellent.

The weight-average molecular weight of a conductive polymer (converted in terms of sodium polystyrene sulfonate) is measured by gel permeation chromatography (GPC).

Considering conductivity, film formability and film strength, the weight-average molecular weight of a conductive polymer is preferred to be 3000~1000000, and more preferably 3000~100000.

The weight-average molecular weight of the conductive polymer is measured (converted in terms of sodium polystyrene sulfonate) by gel permeation chromatography (GPC).

Considering conductivity, film formability and film strength, the weight-average molecular weight of a conductive polymer is preferred to be 3000~1000000, and more preferably 5000~100000.

The weight-average molecular weight of a conductive polymer (converted in terms of sodium polystyrene sulfonate) is measured by gel permeation chromatography (GPC).

Considering conductivity, film formability and film strength, the weight-average molecular weight of the aniline-based conductive polymer is preferred to be 3000 or greater in terms of polyethylene glycol, and more preferably 5000 or greater but 500000 or less. Here, a weight-average molecular weight of 3000 or less results in excellent solubility but insufficient film formability and conductivity, whereas a weight-average molecular weight of 500000 or greater results in insufficient solubility and impregnation into a porous body.

In addition, the higher the conductivity of a solid electrolytic capacitor, the higher the excellence of properties such as frequencies. Therefore, a soluble conductive polymer having conductivity of 0.01 S/cm or greater, preferably 0.05 S/cm or greater, is used.

A solid electrolytic capacitor according to an embodiment of the present invention is described with reference to FIG. 2.

In a solid electrolytic capacitor of the present embodiment, a separator is provided between a dielectric layer formed by oxidizing the surface of the metal (anode) and layers of graphite and metal (cathode), for example. An example of a solid electrolytic capacitor with a separator provided between the anode and cathode is wound-type solid electrolytic capacitor 20 such as shown in FIG. 2.

Figure 2:
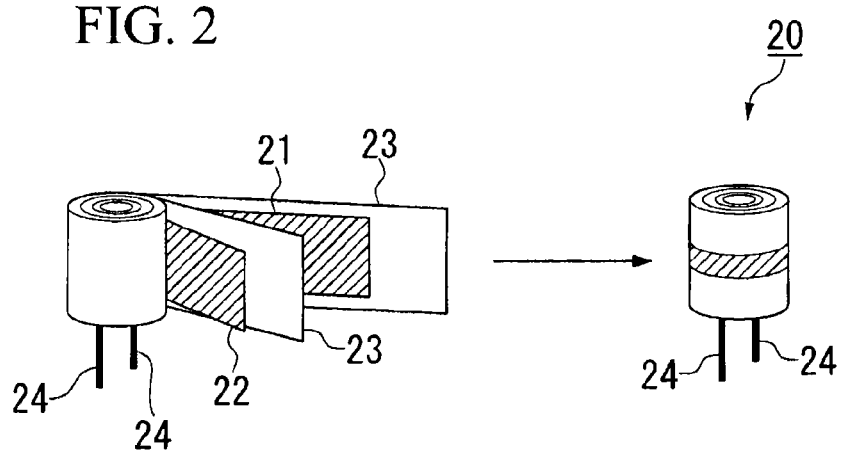
FIG. 2 is a cross-sectional view schematically showing an example of a solid electrolytic capacitor according to an embodiment of the present invention.

In FIG. 2, reference number 21 refers to "anode," reference number 22 to "cathode" and reference number 23 to "separator."

Wound-type solid electrolytic capacitor 20 is obtained by the following procedure: separator 23 is provided between anode 21 and cathode 22, which are wound to make a wound body, then a solid electrolytic layer (omitted in the drawing) is formed on the dielectric layer formed by oxidizing the surface of anode metal, external terminals 24 are connected to anode 21 and cathode 22, and an exterior finish is provided. When a conductive polymer solution is applied on the dielectric layer, a dip-coating method is preferable.

In addition, after separator 23 is provided between anode 21 and cathode 22, it is an option to form a solid electrolytic layer on the dielectric layer formed by oxidizing the surface of the metal, the same as in the above-described laminated solid electrolytic capacitor, and then to form a wound-type capacitor by winding the layers.

As for the material for separator 23 used in wound-type solid electrolytic capacitor 20, fiber, paper, polyethylene terephthalate or the like is used.

Alternatively, a separator in which insulation oil is impregnated or the like may also be used as separator 23. Examples of such insulating oils are electrical insulating oils and their mixtures; for example, mineral-based, diallylethane-based or alkyl benzene-based oils, aliphatic ester oils (such as oleate and fumarate) aromatic ester oils (such as phthalate), polycyclic aromatic oils, silicone oil or the like.

Considering conductivity and heat resistance, conductive polymer (A) is preferred to have an area ratio (X/Y) of 1.20 or greater, obtained using an analytical method that includes steps (I)~(VI) below.

(I) A step for preparing a test solution by dissolving a conductive polymer at a solid concentration of 0.1% by mass in an eluent prepared to have a pH value of 10 or greater.

(II) A step for measuring molecular-weight distributions of the test solution by gel permeation chromatography using a polymer material analysis instrument so that a chromatogram is obtained.

(III) Based on the chromatogram obtained in step (II) above, a step for converting the retention time to molecular weights (M) in terms of sodium polystyrene sulfonate.

(IV) A step for determining area (X) of a region where molecular weight (M) in terms of sodium polystyrene sulfonate is 15000 Da or greater.

(V) A step for determining area (Y) of a region where molecular weight (M) in terms of sodium polystyrene sulfonate is less than 15000 Da.

(VI) A step for calculating area ratio (X/Y) of area (X) to area (Y).

Step (I) is for preparing a test solution by dissolving a conductive polymer in an eluent.

An eluent is a solution in which a substance is dissolved in a solvent. Examples of solvents are water, acetonitrile, alcohol (such as methanol and ethanol), dimethylfomamide, dimethyl sulfoxide, and a mixed solvent thereof.

As for dissolved substances, sodium carbonate, sodium hydrogen carbonate, sodium dihydrogen phosphate, trisodium phosphate, disodium hydrogen phosphate, glycine, sodium hydroxide, potassium chloride, boric acid and the like are listed.

The pH of an eluent used in step (I) is 10 or higher. If the pH is lower than 10, quantitative values may vary. By using an eluent with a pH value of 10 or greater, stable measurement results are obtained.

An eluent with a pH value of 10 or greater is prepared as follows, for example.

First, a mixed solvent is obtained by mixing water (ultra pure water) and methanol by setting a volume ratio of water to methanol at 8:2. Then, in the obtained mixed solvent, sodium carbonate and sodium hydrogen carbonate are added by setting their solid concentrations at 20 mmol/L and 30 mmol/L respectively. Accordingly, an eluent is obtained.

The pH of the obtained eluent at 25° C. is 10.8.

The pH of the eluent is measured using a pH meter when the temperature of the eluent is retained at 25° C.

To prepare an eluent with a pH value of 10 or greater is not limited to the above-described method. For example, using a mixed solvent of water and methanol (water:methanol=8:2), a solution of sodium carbonate with a solid concentration of 20 mmol/L and a solution of sodium hydrogen carbonate with a solid concentration of 30 mmol/L are prepared separately, and then mixed to obtain an eluent.

As long as the solid concentration of a conductive polymer is 0.1% by mass in an eluent, it is an option for the conductive polymer to be dissolved in an eluent when it is still solid, or to be dissolved in advance in a solvent to prepare a conductive polymer solution, which is then added to an eluent. When the solid concentration of a conductive polymer in a test solution is 0.1% by mass, pH buffer action of an eluent works well and stable measurement results are obtained.

When a conductive polymer solution is used, as long as the resulting solid concentration of the conductive polymer when added in an eluent is at 0.1% by mass, the solid concentration of the conductive polymer solution is not limited specifically, but 1.0% by mass or greater is preferable. When a conductive polymer solution with the solid concentration of the conductive polymer at less than 1.0% by mass is added to an eluent, the pH buffer action of the eluent does not work well, resulting in the pH value of the test solution at lower than 10. Thus, quantitative values may vary, and it is difficult to obtain stable measurement results.

In addition, as solvents to be used for a conductive polymer solution, solvents that dissolve later-described conductive polymers are used. Especially, water is preferred.

In step (II), the molecular-weight distribution of a test solution is determined by gel permeation chromatography (GPC) using a polymer material analysis instrument.

The polymer material analysis instrument is equipped with a gel permeation chromatograph for analyzing compounds (polymers, oligomers, monomers) by separating compounds according to their molecular weights.

Detectors such as photodiode array detectors and UV detectors are connected to the gel permeation chromatograph.

In step (II), a chromatogram as shown in FIG. 1 is obtained, for example, by GPC.

In the chromatogram shown in FIG. 1, the vertical axis indicates absorbance and the horizontal axis indicates retention time. High molecular weights are detected by a relatively short retention time, whereas low molecular weights are detected by a relatively long retention time.

Step (III) is for converting the retention time to molecular weight (M) in terms of sodium polystyrene sulfonate based on the chromatogram obtained in step (II).

More specifically, standard samples of sodium polystyrene sulfonate with peak molecular weights of 206, 1030, 4210, 13500, 33500, 78400, 158000 and 2350000 respectively are used. The same as test solutions, standard solutions are prepared by dissolving standard samples in an eluent to set a solid concentration of 0.05% by mass, except that a solid concentration is set at 25 ppm for the standard sample with a peak molecular weight of 206. Then, the relationship between the retention time and the molecular weight of each standard solution is obtained by GPC, and a calibration curve is prepared. Based on the calibration curve, the retention time is converted to molecular weight (M) in terms of sodium polystyrene sulfonate according to the chromatogram obtained in step (II).

Step (IV) is for determining area (X) of region (x) where molecular weights (M) in terms of sodium polystyrene sulfonate are 15000 Da or greater, as shown in FIG. 1, for example.

Step (V) is for determining area (Y) of region (y) where molecular weights (M) are less than 15000 Da.

Step (VI) is for calculating the area ratio (X/Y) of area (X) to area (Y).

Conductive polymers in the embodiments of the present invention are preferred to have area ratio (X/Y) at 1.20 or greater when calculated by the above-described analytical method. When area ratio (X/Y) is 1.20 or greater, the conductive polymer exhibits high conductivity. Reasons are thought to be as follows.

A conductive polymer often contains low molecular-weight substances such as oligomers, unreacted monomers and impurities, which are byproducts generated during the production process. Such low molecular-weight substances are thought to cause lowered conductivity.

Area (Y) is the area of a region where molecular weights (M) are less than 15000 Da, and low molecular-weight substances such as oligomers, monomers and impurities are present in such a region. When area ratio (X/Y) is 1.20 or greater, the proportion of the low molecular-weight substances contained in a conductive polymer is small and the molecular weight of a conductive aniline-based polymer is great. Accordingly, the polymer exhibits high conductivity.

The greater the value of area ratio (X/Y), the smaller the proportion of low molecular-weight substances contained in a conductive polymer. Therefore, area ratio (X/Y) is preferred to be greater. In particular, 1.30 or greater is more preferable, and 1.50 or greater is further preferable.

<Method for Manufacturing Conductive Polymer (A)>

Conductive polymer (A) is obtained by polymerizing an aniline derivative using an oxidant in the presence of a basic compound.

Aniline derivatives used in the embodiments of the present invention are preferred to contain a sulfonic group and/or a carboxyl group. For such acidic group-substituted aniline derivatives, compounds are preferred to be selected from among acidic group-substituted anilines and their alkali metal salts, alkaline earth-metal salts, ammonium salts and substituted ammonium salts.

When excellent conductivity and enhanced solubility are considered, compounds shown in general formula (6) below are preferred for acidic group-substituted anilines.

[Chemical Formula 7]

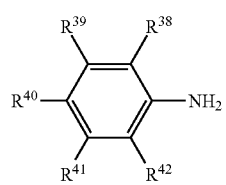

(6)

In formula (6), $R^{38} \sim R^{42}$ are each independently a hydrogen atom, linear or branched alkyl group having 1~24 carbon atoms, linear or branched alkoxy group having 1~24 carbon atoms, acidic group, hydroxyl group, nitro group or halogen atom (—F, —Cl, —Br or I), and at least one of $R^{38} \sim R^{42}$ is an acidic group or its salt.

Among the compounds having general formula (6) above, sulfonic group-substituted anilines or carboxyl group-substituted anilines are most widely used. Especially preferred is a compound where an acidic group is bonded as o-isomer or m-isomer of an amino group, considering the conductivity, solubility or the like of a conductive polymer to be obtained.

Widely used sulfonic group-substituted anilines are aminobenzene sulfonic acids, in particular, the following are preferred to be used: o-, m-, p-aminobenzene sulfonic acids, aniline-2,6-disulfonic acid, aniline-2,5-disulfonic acid, aniline-3,5-disulfonic acid, aniline-2,4-disulfonic acid, and aniline-3,4-disulfonic acid.

Sulfonic group-substituted anilines other than aminobenzene sulfonic acids are as follows, for example: alkyl group-substituted aminobenzene sulfonic acids such as methylaminobenzene sulfonic acid, ethylaminobenzene sulfonic acid, n-propyl aminobenzene sulfonic acid, iso-propyl aminobenzene sulfonic acid, n-butyl aminobenzene sulfonic acid, sec-butyl aminobenzene sulfonic acid, and t-butyl aminobenzene sulfonic acid; alkoxy group-substituted aminobenzene sulfonic acid such as methoxy aminobenzene sulfonic acid, ethoxy aminobenzene sulfonic acid, and propoxy aminobenzene sulfonic acid; hydroxyl group-substituted aminobenzene sulfonic acids; nitro group-substituted aminobenzene sulfonic acids; and halogen group-substituted aminobenzenesulfonic acids such as fluoro aminobenzene sulfonic acid, chloro aminobenzene sulfonic acid, and brom aminobenzene sulfonic acid.

Among the above, the following are preferred because conductive polymers with excellent conductivity and solubility are obtained: alkyl group-substituted aminobenzene sulfonic acids, alkoxy group-substituted aminobenzene sulfonic acids, hydroxyl group-substituted aminobenzene sulfonic acids, or halogen group-substituted aminobenzene sulfonic acids.

Such sulfonic acid group-substituted anilines may each be used alone, or two or more may be combined in various proportions.

Widely used carboxyl group-substituted anilines are aminobenzene carboxylic acids; in particular, the following are preferred to be used: o-, m-, p-aminobenzene carboxylic acids, aniline-2,6-dicarboxylic acid, aniline-2,5-dicarboxylic acid, aniline-3,5-dicarboxylic acid, aniline-2,4-dicarboxylic acid, and aniline-3,4-dicarboxylic acid.

Carboxyl group-substituted anilines other than aminobenzene carboxylic acids are as follows: alkyl group-substituted aminobenzene carboxylic acids such as methylaminobenzene carboxylic acid, ethylaminobenzene carboxylic acid, n-propyl aminobenzene carboxylic acid, iso-propyl aminobenzene carboxylic acid, n-butyl aminobenzene carboxylic acid, sec-butyl aminobenzene carboxylic acid, and t-butyl aminobenzene carboxylic acid; alkoxy group-substituted aminobenzene carboxylic acids such as methoxyaminobenzene carboxylic acid, ethoxyaminobenzene carboxylic acid, and propoxyaminobenzene carboxylic acid; hydroxyl group-substituted aminobenzene carboxylic acids; nitro group-substituted aminobenzene carboxylic acids; and halogen group-substituted aminobenzene carboxylic acids such as fluoro aminobenzene carboxylic acid, chloro aminobenzene carboxylic acid, and brom aminobenzene carboxylic acid.

Among other carboxyl group-substituted anilines, the following are preferred for practical use because conductive polymers with excellent conductivity and solubility are obtained: alkyl group-substituted aminobenzene carboxylic acids, alkoxy group-substituted aminobenzene carboxylic acids, or halogen group-substituted aminobenzene carboxylic acids.

Such carboxyl group-substituted anilines may each be used alone, or two or more (including isomers) may be combined in various proportions.

Among acidic group-substituted anilines shown as general formula (6), because the manufacturing process is simplified, at least one type of compound selected from among alkoxyl group-substituted aminobenzenesulfonic acids and their alkali salts, ammonium salts and substituted ammonium salts is especially preferred.

As for basic compounds, inorganic bases, ammonia, alicyclic amines, cyclic saturated amines, cyclic unsaturated amines and the like are used.

Examples of inorganic bases are salts of sodium hydroxide, potassium hydroxide, lithium hydroxide, magnesium hydroxide, calcium hydroxide and the like. Salts of sodium hydroxide are especially preferred, considering the conductivity, solubility and the like of the obtained polymers.

Samples of alicyclic amines are compounds shown in general formula (7) below, ammonium hydroxides shown in general formula (8) below and the like.

[Chemical Formula 8]

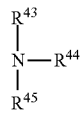

(7)

In formula (7), $R^{43}$~$R^{45}$ are each independently an alkyl group with 1~4 carbon atoms.

[Chemical Formula 9]

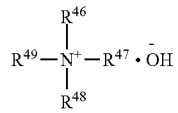

(8)

In formula (8), $R^{46}$~$R^{49}$ are each independently a hydrogen atom or alkyl group having 1~4 carbon atoms.

Examples of cyclic saturated amines are piperidine, pyrrolidine, morpholine and piperazine and derivatives having their skeletal formulas as well as their ammonium hydroxide compounds.

Examples of cyclic unsaturated amines are: pyridine, α-picoline, β-picoline, γ-picoline, quinoline, isoquinoline, pyrroline, derivatives having their skeletal formulas, and their ammonium hydroxide compounds and the like.

Basic compounds are preferred to be inorganic bases. Other than inorganic bases, the following basic compounds are also preferably used: methylamine, dimethylamine, trimethylamine, ethylamine, diethylamine, triethylamine, ethylmethylamine, ethyldimethylamine, diethylmethylamine, pyridine, α-picoline, β-picoline, and γ-picoline.

Using such inorganic bases and basic compounds, highly refined conductive polymers with high conductivity are obtained.

Such basic compounds may each be used alone, or two or more compounds may be combined in various proportions.

Considering reactive and conductive properties, the concentration of a basic compound is preferred to be 0.1 mol/L or greater, more preferably 0.1~40.0 mol/L, and even more preferably 0.2~8.0 mol/L.

Considering reactive and conductive properties, the mass ratio of the above-described acidic group-substituted aniline derivative (monomer) to a basic compound is preferred to be 1:100~400:1, more preferably, 10:100~400:10, even more preferably 10:90~90:10, and further more preferably 10:20~10:5.

Examples of alkali metals that can form salts with acidic group-substituted anilines are lithium, sodium, potassium, cesium and the like, and examples of alkaline earth metals that can form such salts are magnesium, calcium, barium and the like.

Examples of substituted ammonia that can form salts with acidic group-substituted anilines are alicyclic ammonia, cyclic saturated ammonia, cyclic unsaturated ammonia and the like.

Alicyclic ammonia above is shown in general formula (9) below.

[Chemical Formula 10]

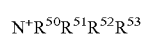

(9)

In the formula, $R^{50}$~$R^{53}$ are each a group independently selected from hydrogen and alkyl groups having 1~4 carbon atoms.

In particular, examples of alicyclic ammonia are, primary alkyl ammonia such as methylammonium, secondary alkyl ammonia such as dimethylammonium, tertiary alkyl ammonia such as alkyl trimethylammonium, and quaternary alkyl ammonia such as tetramethylammonium.

Among those, when solubility is considered, tertiary alkyl ammonia having 1~4 carbon atoms shown as $R^{33}$~$R^{36}$ is most preferred, and secondary alkyl ammonia having 1~4 carbon atoms shown as $R^{33}$~$R^{36}$ is next preferred.

Examples of cyclic saturated ammonia are such as follows: piperidinium, pyrrolidinium, morpholinium, piperazinium, derivatives having their skeletal formulas, and the like. Examples of cyclic unsaturated ammonia are such as follows: pyridinium, α-picolinium, β-picolinium, γ-picolinium, quinolinium, isoquinolinium, pyrrolinium, derivatives having their skeletal formulas, and the like.

Oxidants are not limited specifically as long as the standard electrode potential is 0.6 V or higher, for example; however, the following are preferred to be used: peroxodisulfates such as peroxodisulfate, ammonium peroxodisulfate, sodium peroxodisulfate, and potassium peroxodisulfate; hydrogen peroxide, and the like.

Such oxidants may each be used alone, or two or more compounds may be combined in various proportions.

The amount of an oxidant is preferred to be 1~5 mol, more preferably 1~3 mol, per 1 mol of a monomer described above.

In the embodiments of the present invention, it is important to polymerize by setting the molar ratio of an oxidant to the monomer at one or greater. It is also effective to use transition metal compounds such as iron and copper as a catalyst along with an oxidant.

Examples of polymerization methods are a method for dripping a mixed solution of a monomer and a basic compound into an oxidation solution, a method for dripping an oxidation solution into a mixed solution of a monomer and a basic compound, and a method for simultaneously dripping an oxidation solution and a mixed solution of a monomer and a basic compound into a reaction vessel.

Examples of solvents for polymerization are water or a mixed solvent of water and water-soluble organic solvent. Water-soluble organic solvents are not limited to a specific type as long as they are soluble with water. For example, alcohols such as methanol, ethanol, n-propanol, isopropanol, n-butanol, isobutanol, 2-butanol, 3-butanol, t-butanol, 1-pentanol, 3-methyl-1-butanol, 2-pentanol, n-hexanol, 4-methyl-2-pentanol, 2-ethylbutynol, benzyl alcohol, furfuryl alcohol, tetrahydrofurfuryl alcohol, and the like; polyalcohol derivatives such as ethylene glycol monomethyl ether, ethylene glycol monoethyl ether, (methoxymethoxy)ethanol, propylene glycol monoethyl ether, and glycerol monoacetate; acetone, acetonitrile, dimethylformamide, dimethylacetamide and the like.

When a mixed solvent is used, the mixing ratio of water to a water-soluble organic solvent is not limited specifically; however, the ratio of water to a water-soluble organic solvent is preferred to be 1:100~100:1.

After polymerization, the solvent is usually filtered in a filtration vessel using a centrifugal separator or the like. Moreover, if required, the filtered substance is washed with a cleansing solution and dried to obtain a polymer (conductive polymer).

As for cleansing solutions, the following are preferred, for example, to obtain highly refined polymers: alcohols such as methanol, ethanol, n-propanol, isopropanol, n-butanol, isobutanol, 2-butanol, 3-butanol, t-butanol, 1-pentanol, 3-methyl-1-butanol, 2-pentanol, n-hexanol, 4-methyl-2-pentanol, 2-ethylbutynol, benzyl alcohol, furfuryl alcohol, tetrahydrofurfuryl alcohol, and the like; polyalcohol derivatives such as ethylene glycol monomethyl ether, ethylene glycol monoethyl ether, (methoxymethoxy) ethanol, propylene glycol monoethyl ether, and glycerol monoacetate; acetone, acetonitrile, N,N-dimethylformamide, N-methylpyrrolidone, and dimethyl sulfoxide. Among the above, methanol, ethanol, isopropanol, acetone and acetonitrile are especially effective.

When the amount of a basic compound that forms the salt in (soluble aniline-based) conductive polymer (A) obtained by the above manufacturing methods exceeds 0.1% by mass, refining treatments or the like described later are performed on the polymer so that the amount of the basic compound (salt) is reduced to 0.1% by mass or less. Considering conductivity and heat resistance, the amount of the basic compound is preferred to be 0.1% by mass or less.

<Refining Process>

Conductive polymer (A) obtained by the above manufacturing methods may contain unreacted monomers, low molecular-weight substances, impurities and the like, which cause a reduction in conductivity. Thus, such impurities and the like are preferred to be removed.

To remove impurities such as unreacted monomers and low molecular-weight substances, it is preferred to filter a solution or dispersion of the conductive polymer by using a membrane. The solvent used for membrane filtration is water, water with basic salts, water with acids, water with alcohol or a mixed solution thereof, for example. Among examples of the separation membrane used for membrane filtration, an ultrafiltration membrane is preferred, considering the efficiency of removing unreacted monomers, low molecular-weight substances and impurities.

As for the material for separation membranes, following are used: organic membranes using polymers such as cellulose, cellulose acetate, polysulfone, polypropylene, polyester, polyethersulfone and polyvinylidene fluoride; or inorganic membranes made of inorganic materials such as ceramics. The material is not limited specifically, as long as it is generally used for the material of ultrafiltration membranes.

Moreover, conductive polymer (A) obtained by the above manufacturing methods forms a salt with cations derived from the oxidant or the like. Such salts cause lowered conductivity. Thus, conductivity is enhanced by removing cations.

To remove impurities such as cations, it is preferred for the solution or dispersion of the conductive polymer to be brought into contact with a cation exchange resin.

When removing impurities by a cation exchange resin, conductive polymer (A) dispersed or dissolved in a solvent is used.

As for solvents, the following or a mixture thereof are preferred: water, alcohols such as methanol, ethanol, isopropanol, propanol, and butanol; ketones such as acetone, methyl ethyl ketone, ethyl isobutyl ketone, methyl isobutyl ketone, ethylene glycols such as ethylene glycol, ethylene glycol methyl ether, and ethylene glycol mono-n-propyl ether; propylene glycols such as propylene glycol, propylene glycol methyl ether, propylene glycol ethyl ether, propylene glycol butyl ether, and propylene glycol propyl ether; amides such as dimethylformamide, and dimethylacetamide; pyrrolidones such as N-methylpyrrolidone, and N-ethylpyrrolidone; hydroxyl esters such as methyl lactate, ethyl lactate, methyl β-methoxyisobutyrate and methyl α-hydroxyisobutyrate.

When the conductive polymer is dispersed or dissolved in the solvent above, its concentration is preferred to be 0.1~20% by mass, more preferably 0.1~10% by mass, from the viewpoints of industrial applicability and refining efficiency.

A commercially available cation exchange resin is used. An example is a strongly acidic cation exchange resin such as "Amberlite" made by Organo Corporation.

Regarding cation exchange resin, it is not limited to any specific type, and various types such as spherical granules, film or fiber may be used.

The amount of cation exchange resin per 100 parts by mass of a conductive polymer is preferred to be 100~2000 parts by mass, more preferably 500~1500 parts by mass. If the amount of cation exchange resin is less than 100 parts by mass, impurities such as cations may not be sufficiently removed. On the other hand, if the amount of cation exchange resin exceeds 2000 parts by mass, since such an amount is excessive relative to a solution or dispersion of the conductive polymer, it is difficult to collect the dispersion or solution after the cation exchange treatment was conducted by bringing the solution or dispersion into contact with the cation exchange resin.

As for a method for bringing a dispersion or solution of a conductive polymer into contact with cation exchange resin, the dispersion or solution of a conductive polymer and cation exchange resin are put into a vessel, and are then agitated or rotated.

Alternatively, cation exchange resin is filled in a column through which a dispersion or solution of the conductive polymer flows at a flow rate of SV=0.01~20, more preferably 0.2~10, to perform cation exchange treatment.

Here, space velocity SV (1/hr)=flow rate ($m^3$/hr)/filtration medium amount (volume: $m^3$).

The duration for a dispersion or solution of a conductive polymer to be in contact with cation exchange resin is preferred to be 0.1 hour or longer, preferably 0.5 hour or longer, considering refinery efficiency.

The maximum duration for contact is not limited specifically, and it should be properly adjusted according to conditions such as the concentration of a dispersion or solution of the conductive polymer, the amount of cation exchange resin, contact temperature described below, and the like.

The temperature at which a dispersion or solution of the conductive polymer makes contact with cation exchange resin is preferred to be 10~50° C., more preferably 10~30° C., from an industrial point of view.

The conductive polymer refined as above exhibits even more excellent conductivity, since impurities such as low molecular-weight oligomers and monomers, cations and the like are removed sufficiently.

<Alkali Metal Hydroxide and/or Alkaline Earth Metal Hydroxide (B)>

By adding metal hydroxide and/or alkaline earth metal hydroxide (B) to conductive polymer (A) refined through contact with cation exchange resin, a reduction in conductivity following thermal treatment is suppressed. That is thought to be because alkali metal ions or alkaline earth metal ions suppress side chains of conductive polymer (A) from decomposing after thermal treatment.

As for alkali metal hydroxides and/or alkaline earth metal hydroxides (B), the following are listed. Examples of alkali metal hydroxides are lithium hydroxide, sodium hydroxide, potassium hydroxide, rubidium hydroxide, cesium hydroxide, and the like. Examples of alkaline earth metal hydroxides are beryllium hydroxide, magnesium hydroxide, calcium hydroxide, strontium hydroxide, barium hydroxide, and the like.

Such hydroxides may each be used alone, or two or more hydroxides may be combined.

The amount of alkali metal hydroxide and/or alkaline earth metal hydroxide (B) is preferred to be 0.2~0.65 mol, more preferably 0.3~0.6 mol, per 1 mol of a repeating unit (monomer unit) containing a sulfonic acid group and/or carboxyl group in conductive polymer (A).

<Compound (C) Containing at Least One Selected from Acetates, Carbonates, Phosphates and Halides of Alkali Metals and/or Alkaline Earth Metals>

By adding compound (C) to refined conductive polymer (A), a reduction in conductivity following thermal treatment is suppressed. That is thought to be because desorption of side chains of conductive polymer (A) when heat is added is suppressed by metal ions of compound (C).

Examples of compound (C) are acetates, carbonates, phosphates, or halides of alkali metals such as lithium, sodium, potassium, rubidium, cesium and the like; and/or the above salts or halides of alkaline earth metals such as beryllium, magnesium, calcium, strontium, and barium.

Among the above, acetates, carbonates, phosphates or halides of lithium, sodium, magnesium or calcium are preferred from reactive or economic viewpoints. Also, considering the ease of handling, acetates, carbonates and halides are preferred among the above compounds.

Here, compound (C) containing at least one selected from acetates, carbonates, phosphates and halides of alkali metals and/or alkaline earth metals may be simply referred to as alkali metal salt and/or alkaline earth metal salt (C).

Also, other than the above-mentioned acetates, carbonates, phosphates and halides, compound (C) may be nitrates of alkali metals and/or alkaline earth metals.

The amount of compound (C) above is preferred to be 0.01~2.0 mol, more preferably 0.1~1.5 mol, even more preferably 0.2~1.0 mol, per 1 mol of a repeating unit (monomer unit) of conductive polymer (A), considering conductivity and heat resistance.

<Compound (D) Containing a Basic Group and at Least Two Hydroxyl Groups in the Same Molecule and Having a Melting Point of 30° C. or Higher>

To refined conductive polymer (A), by adding compound (D) containing a basic group and at least two hydroxyl groups in the same molecule and having a melting point of 30° C. or higher, a reduction in conductivity following thermal treatment is suppressed.

That is thought to be because desorption of side chains of conductive polymer (A) when heat is added is suppressed by the basic group in compound (D), and/or because the hydroxyl groups contained in compound (D) work as a dopant for conductive polymer (A) to enhance conductivity.

Compound (D) has a chemical structure shown in general formula (10) below.

[Chemical Formula 11]

$$A^1\text{-}R^{54}\text{—}B^1 \quad (10)$$

In formula (10), $A^1$ is a hydroxyl group, $B^1$ is a basic group and $R^{54}$ is an organic group.

As for hydroxyl groups, it may be a hydroxyl group as is, or it may be protected by a protective group. Examples of protective groups are silyl groups such as acetyl group, trimethylsilyl group, t-butyl dimethylsilyl group and the like, acetal-type protective groups (for example, methoxymethyl group, ethoxymethyl group, or methoxyethoxymethyl group), benzoyl group and the like. It may also be an alkoxide group.

Examples of basic groups are, for example, basic groups defined by Arrhenius bases, Bronsted bases, Lewis bases or the like. As for organic groups, for example, aliphatic, alicyclic, aromatic, linear or branched, saturated and/or unsaturated organic groups are listed.

Examples of compound (D) containing a basic group and at least two hydroxyl groups in the same molecule and having a melting point of 30° C. or higher are as follows: 2-amino-1,3-propanediol, 3-amino-1,2-propanediol, tris(hydroxymethyl)aminomethane, 2-amino-2-methyl-1,3-propanediol, 2-amino-2-ethyl-1,3-propanediol, N,N-di(2-hydroxyethyl)glycine, 3-[N-Tris(hydroxymethyl) methylamino]-2-hydroxypropane-sulfonic acid, N-tris (hydroxymethyl)methyl-2-aminoethanesulfonic acid, 3-(3, 4-dihydroxyphenyl)-L-alanine, N,N-bis(2-hydroxyethyl)-2-aminoethanesulfonic acid, N-tris(hydroxymethyl)methyl-3-aminopropanesulfonic acid and the like.

In addition, geometric isomers L-form and D-form may exist in some examples of compound (D). It is an option to use either L- or D-form, or to mix L- and D-forms in various proportions.

In some examples of compound (D), there are also positional o-, m- and p-isomers of a substituted group. It is an option to select o-, m- or p-isomer, or to mix such isomers in various proportions.

Especially, when conductivity and heat resistance are considered, the following are more preferable: 2-amino-1, 3-propanediol, tris(hydroxymethyl)aminomethane, 2-amino-2-methyl-1,3-propanediol, 2-amino-2-ethyl-1,3-propanediol, 3[N-Tris(hydroxymethyl)methylamino]-2-hydroxypropane-sulfonic acid, and N-Tris(hydroxymethyl) methyl-2-aminoethanesulfonic acid. The above types of compound (D) may each be used alone, or two or more types may be combined.

In addition, considering conductivity and heat resistance, the amount of compound (D) is preferred to be 0.01~0.65 mol, more preferably 0.05~0.45 mol, per 1 mol of a repeating unit (monomer unit) containing a sulfonic acid group and/or carboxyl group in conductive polymer (A).

The melting point of compound (D) is preferred to be determined by a method according to "Test Methods for Melting Point and Melting Range of Chemical Products" described in "JIS K 0064" of Japan Industrial Standards. Alternatively, the melting point may also be determined by "ACROSS ORGANICS (2004, vol. 4)," "Aldrich (2005-2006, JAPAN)," "THE MERCK INDEX (twelfth edition)" or "Chemical Fundamentals Handbook, compiled by The Chemical Society of Japan (Maruzen Publishing)."

Regarding a compound containing a basic group and at least two hydroxyl groups in the same molecule and having a melting point of 30° C. or higher, even when its melting point measured by a method other than the above is lower than 30° C., as long as its melting point measured by the above methods is 30° C. or higher, such a compound is included as compound (D) in a conductive composition relating to the present invention.

<Compound (E) Containing at Least One Each Acidic Group and Basic Group in the Same Molecule>

When compound (E) that contains at least one each acidic group and basic group in the same molecule is added to conductive polymer (A), a reduction in conductivity following thermal treatment is suppressed.

That is thought to be because the desorption of side chains of conductive polymer (A) caused by thermal treatment is suppressed by the basic group contained in compound (E), and/or because the acidic group contained in compound (E) works as a dopant for conductive polymer (A) to enhance conductivity.

Here, compound (E) has the chemical structure shown in general formula (11) below.

[Chemical Formula 12]

$$A^2-R^{55}-B^2 \qquad (11)$$

In formula (11), $A^2$ is an acidic group, $B^2$ is a basic group and $R^{55}$ is an organic group.

Examples of acidic groups are organic acid groups such as carboxylic acid groups and sulfonic acid groups, and inorganic acid groups such as phosphoric acid, boric acid, and chromic acid groups.

Examples of basic groups are those defined according to Arrhenius bases, Bronsted bases, Lewis bases or the like.

Examples of organic groups are aliphatic, alicyclic, aromatic, linear or branched, saturated and/or unsaturated organic groups.

Examples of compound (E) containing at least one each of acidic group and basic group in the same molecule are: glycine, L-alanine, â-alanine, 4-aminobutyric acid, 2-aminomethanesulfonic acid, 2-aminoethanesulfonic acid, 2-aminopropanesulfonic acid, sarcosine, 4-piperidinecarboxylic acid, proline, 2-Benzimidazolepropionic acid, norvaline, serine, threonine, 2-(4-hydroxyphenyl)glycine, N,N-di(2-hydroxyethyl)glycine, tyrosine, 3-(3,4-dihydroxyphenyl)-alanine, isoserine, 4-amino-3-hydroxybutyric acid, homoserine, histidine, aspartic acid, cysteine, cysteic acid, lysine, arginine, iminodiacetic acid, glutamic acid, 2-aminoadipic acid, 2,6-diaminopimelic acid, guanidinoacetate, thiazolidine-2,4-dicarboxylic acid, cystine, and the like.

In addition, some examples of compound (E) have stereoisomer L-form and D-form and enantiomer. It is an option to use either L-form or D-form, or to combine L- and D-forms in various proportions.

Especially, considering conductivity and heat resistance, the following are preferred: 2-(4-hydroxyphenyl)glycine, isoserine, serine, cysteic acid, aspartic acid, 2-aminoethanesulfonic acid, glycine, alanine, homoserine, and threonine.

Even more preferred are: 2-(4-hydroxyphenyl)glycine, isoserine, serine, cysteic acid, aspartic acid, 2-aminoethanesulfonic acid, glycine, alanine, homoserine, and threonine.

Those examples of compound (E) may each be used alone, or two or more may be combined.

Considering conductivity and heat resistance, the amount of compound (E) is preferred to be 0.1~0.65 mol, more preferably 0.15~0.45 mol, per 1 mol of a repeating unit (monomer unit) containing a sulfonic acid group and/or carboxyl group in conductive polymer (A).

<Compound (F) Containing at Least Two Carboxylic Acids or their Salts in the Same Molecule>

When compound (F) containing at least two carboxylic acids or their salts in the same molecule is added to conductive polymer (A), a reduction in conductivity following thermal treatment is suppressed.

That is thought to be because the dicarboxylic acid contained in compound (F) works as a dopant and prevents desorption of side chains of conductive polymer (A). Thus, dedoping is prevented during thermal treatment, and a reduction of conductivity is suppressed.

In addition, when the dicarboxylic acid forms a salt, it also works as a dopant. Therefore, the same effect is thought to be achieved as when a dicarboxylic acid does not form a salt.

When a dicarboxylate is added, it forms a salt with an acidic group in the side chain of the conductive polymer, and thermal desorption is suppressed. Therefore, it is preferred that a salt be formed from the viewpoint of heat resistance.

Examples of compound (F) containing at least two carboxylic acids or their salts in the same molecule used for a conductive composition described above are selected from aliphatic, alicyclic, aromatic, linear or branched, saturated and/or unsaturated dicarboxylic acids, dicarboxylic acids containing heteroatoms and polycarboxylic acids.

Aliphatic dicarboxylic acids having 2~20 carbon atoms are, for example, oxalic acid, malonic acid, succinic acid, fumaric acid, maleic acid, glutaric acid, adipic acid, pimelic acid, suberic acid, azelaic acid, sebacic acid, dodecanoic diacid, tetradecanoic diacid, hexadecanoic diacid, octadecanoic diacid, and eicosane diacid.

Alicyclic dicarboxylic acids having 3~10 carbon atoms are, for example, 1,4-cyclohexanedicarboxylic acid, 1,3-cyclohexanedicarboxylic acid, 1,3-cyclopentanedicarboxylic acid and the like.

Aromatic dicarboxylic acids are, for example, those unsubstituted or substituted with various substituents and having 8~20 carbon atoms such as follows: phthalic acid, terephthalic acid, isophthalic acid, naphthalenedicarboxylic acid, 2-chloro terephthalic acid, 2-methylterephthalic acid, 5-methylisophthalic acid, 5-sodiumsulfoisophthalic acid; and the like.

As for dicarboxylic acids containing heteroatoms, they are, for example, alkylether dicarboxylic acids such as diglycolic acid, methylene bis(glycolic acid), and epoxysuccinic acid; dicarboxylic acids containing imine such as Iminodiacetic acid; dicarboxylic acids containing sulfide, sulphides such as 2,2'-thioglycolic acid, 3,3'-thiopropylene acid, and methylene bis(glycolic acid).

Polycarboxylic acids are, for example, citric acids.

Dicarboxylic acids above may be unsubstituted or substituted.

Examples of substituents are, amino group, hydroxy group, alkoxy group, phenoxy group, alkyl group, allyl group, acetyl group, thiol group, halogen group, silyl group, and their salts such as sodium salts.

Amino group-substituted dicarboxylic acids of aliphatic dicarboxylic acids are, for example, 2-methylmalonic acid, aspartic acid, glutamic acid, 2-aminoadipic acid, 2,6-diaminopimelic acid, and the like.

In addition, some dicarboxylic acids include geometric trans and cis isomers. It is an option to use either a trans or a cis isomer, or to combine them in various proportions.

The amount of compound (F) to be used in a conductive composition is preferred to be 0.05~2.0 mol, more preferably 0.1~1.5 mol, even more preferably 0.1~1.0 mol, and further more preferably 0.1~0.75 mol, per 1 mol of a repeating unit (monomer unit) containing a sulfonic acid group and/or carboxyl group in conductive polymer (A).

Compounds (B)~(F) may be used alone, or two or more types may be combined, depending on usage purposes or the like from the viewpoints of conductivity and heat resistance.

Compositions made of conductive polymer (A) and compounds (B)~(F) respectively are each preferred to contain solvent (G) shown below to enhance film formability.
<Solvent (G)>

As for solvent (G), it is sufficient if it dissolves conductive polymer (A) and compound (B), conductive polymer (A) and compound (C), conductive polymer (A) and compound (D), conductive polymer (A) and compound (E), or conductive polymer (A) and compound (F). For example, water or a mixed solvent of water and water-soluble organic solvent is used.

When a mixed solvent is used, the mixing ratio of water and a water-soluble organic solvent is not limited specifically. In a mixed solvent, the ratio of water to a water-soluble organic solvent is preferred to be 1:100~100:1.

Water-soluble organic solvents are not limited specifically as long as they are soluble in water. In particular, alcohols such as acetonitrile, methanol, ethanol, isopropanol, n-propanol, and n-butanol; ketones such as acetone, methyl ethyl ketone, ethyl isobutyl ketone, and methyl isobutyl ketone; ethylene glycols such as ethylene glycol, ethylene glycol methyl ether, and ethylene glycol mono-n-propyl ether; propylene glycols such as propylene glycol, propylene glycol methyl ether, propylene glycol ethyl ether, and propylene glycol propyl ether; amides such as dimethylformamide and dimethylacetamide; pyrrolidones such as N-methylpyrrolidone and N-methylpyrrolidinone; and hydroxyl esters such as methyl lactate, ethyl lactate, β-methoxyisomethyl butyrate, and α-hydroxymethyl butyrate.

Among those, from the viewpoint of solubility, alcohols, acetone, acetonitrile, dimethylformamide, dimethylacetamide and the like are preferred, and alcohols are especially preferred. As for alcohols, methanol, ethanol and isopropanol and the like are preferred.

Water, a mixed solvent of water and acetonitrile, or a mixed solvent of water and alcohol is preferred to be used as solvent (G), considering solubility and film formability. Water or a mixed solvent of water and alcohols is more preferred. In addition, such a mixed solvent is preferred to contain 50% by mass or more of water.

Since the conductive polymer after cation exchange treatment is either dispersed or dissolved in a solvent such as water, a solid conductive polymer is obtained if the solvent is removed using an evaporator or the like. However, a conductive polymer either dispersed or dissolved in a solvent may also be used.

In a conductive composition, the amount of component (A) is preferred to be 0.1~20 parts by mass, more preferably 0.5~10 parts by mass, even more preferably 0.5~5 parts by mass, per 100 parts by mass of solvent (G), considering conductivity and the ease of processing. The higher the concentration, the thicker the conductive polymer layer. On the other hand, if the concentration is low, the conductive polymer and a compound in the solution are suppressed from agglomerating, and the viscosity of the solution is less likely to increase. Accordingly, it is easier to impregnate the solution into minutely roughened anodic oxide layer.
<Manufacturing Conductor>

According to an embodiment of the present invention, a conductor is manufactured by a step for forming a coating film by applying the conductive composition above on a substrate, and by a step for performing thermal treatment on the coating film as necessary.

A substrate on which to apply the conductive composition is not limited to any specific type; polymeric compounds, wood material, paper material, metal, metal oxides, ceramics and their films, glass sheet or the like may be used. For example, substrates made of polymeric compounds are polymer films containing one of the following or a combination of two or more: polyethylene, polyvinyl chloride, polypropylene, polystyrene, ABS resin, AS resin, methacrylic resin, polybutadiene, polycarbonate, polyarylate, polyvinylidene fluoride, polyamide, polyimide, polyaramide, polyphenylene sulfide, polyetheretherketone, polyphenylene ether, polyether nitrile, polyamide-imide, polyether sulfone, polysulfone, polyetherimide, polybutylene terephthalate and the like.

To form conductor film made of the conductive composition at least on one surface of such polymer film, corona surface treatment, plasma treatment, or UV-ozone treatment is preferred to be performed on the film surface so that the adhesiveness of the conductive film is enhanced.

For applying the conductive composition, methods for applying coating material are employed. For example, gravure coater, roll coater, curtain flow coater, spin coater, bar coater, reverse coater, kiss-roll coater, fountain coater, rod coater, air doctor coater, knife coater, blade coater, cast coater, screen coater, spray methods such as spray coating, immersion methods such as dipping and the like.

<Conductive Polymer Layer>

A conductive polymer layer relating to the present invention is formed with a conductive composition made by mixing a soluble aniline-based conductive polymer, a compound containing at least two carboxylic acids or their salts in the molecule, and a solvent.

Methods for forming a conductive polymer layer are as follows: dip coating, brush coating, spin coating, casting, micro gravure coating, gravure coating, bar coating, roll coating, wire-bar coating, spray coating, flow coating, screen printing, flexographic printing, offset printing, and inkjet printing. Among those, dip coating is preferred because of the ease of operation.

When a conductive composition is applied by dip coating, the immersion time in a conductive composition is preferred to be 1~30 minutes when the efficiency of the working process is considered. In addition, it is effective to perform dip coating under reduced pressure and to return the pressure to normal after dipping. Alternatively, it is also effective to add pressure during the dipping process.

As the drying method after a conductive polymer layer is formed, thermal drying is preferred. However, air drying or spinning to physically dry the layer may also be employed.

In addition, conditions for drying the layer are determined according to the types of conductive polymer (A), compounds (B)~(F), and solvent (G). Usually, the drying temperature is preferred to be 50° C.~190° C., and the drying duration is preferred to be 1~120 minutes.

The conductor described above is also used for a capacitor. The conductor is used in aluminum electrolytic capacitors, tantalum capacitors, solid electrolytic capacitors and the like. For example, forming a wound-type capacitor is described using the conductive polymer as the solid electrolyte for a solid electrolytic capacitor.

First, prepared are an anode foil on which a dielectric layer is formed by oxidizing the surface of the anode and a cathode foil on which etching is conducted or conversion treatment is performed after etching. Next, a capacitor element is formed by winding the anode and cathode with a separator interposed inbetween. Then, a conductive polymer layer made of the above-described conductive polymer is formed in the element.

For forming a conductive polymer layer, an anode foil or a capacitor element is impregnated with a dispersion of a conductive polymer.

Next, carbon paste is applied on the conductive polymer layer so that a carbon layer is formed on the conductive polymer layer. Silver paste is further applied on the carbon layer and dried at a predetermined temperature to form a silver-paste layer on the carbon layer. A cathode terminal is connected to the silver-paste layer through conductive adhesive. Also, an anode terminal is connected to the anode foil.

Next, the exterior is formed using molding resin in such a way that the end portions of the anode and cathode terminals are extracted to the outside. Accordingly, a solid electrolytic capacitor is obtained.

<Method for Manufacturing Wound-Type Solid Electrolytic Capacitor>

In an embodiment of the present invention, a wound-type solid electrolytic capacitor is formed using a well-known technology in addition to forming a conductive polymer layer relating to the present invention.

For example, the portion near the surface layer of aluminum foil is made porous through etching, and an anodic layer is formed by oxidizing the anode surface. Then, after a solid electrolyte including a conductive polymer layer relating to the present invention is formed, a cathode portion is formed. External terminals are connected to the anode and cathode portions and the exterior is finished. Accordingly, a wound-type solid electrolytic capacitor of the present embodiment is obtained.

The anodic layer is formed by oxidizing the surface of the anode (valve metal body) made of metallic material (metal layer) such as aluminum, tantalum, niobium or nickel. The anodic layer formed by oxidizing a porous valve metal body has a finely roughened surface reflecting the surface of the valve metal body. The period of such a roughened surface depends on the type of valve metal body, and is usually approximately 200 nm or less.

In addition, the depth of a concave portion (pore) of the roughened structure is not generally determined since it especially depends on the type of valve metal body. For example, if aluminum is used, the depth of a concave portion is approximately scores of nanometers to 1 micron.

<Method for Manufacturing Laminated Solid Electrolytic Capacitor>

In an embodiment of the present invention, a laminated solid electrolytic capacitor is formed using a well-known technology in addition to forming a conductive polymer layer relating to the present invention.

For example, the portion near the surface layer of a valve metal body such as aluminum foil is made porous through etching, and an anodic layer is formed by oxidizing the anode metal. Then, a conductive polymer layer is formed on the anodic layer, which is impregnated with a graphite solution, or on which a graphite solution is applied, to form a graphite layer on the conductive polymer layer. A metal layer is further formed on the graphite layer. External terminals are connected to the anode and cathode portions and the exterior is finished. Accordingly, a laminated solid electrolytic capacitor of the present embodiment is obtained.

EXAMPLES

In the following, the present invention is described in detail with reference to examples and comparative examples. However, the present invention is not limited to such examples and comparative examples.

The methods for analyzing the examples and comparative examples are as follows.

Calculation of Area Ratio (X/Y)

First, an eluent was prepared as follows: In a mixed solvent prepared to have a volume ratio of water (ultrapure water) to methanol at 8:2, sodium carbonate and sodium hydrogen carbonate were added to have solid concentrations of 20 mmol/L and 30 mmol/L respectively. The pH value of the obtained eluent was 10.8 at 25° C.

A test solution was prepared by dissolving a conductive polymer solution to have a solid concentration of 0.1% by mass (step (I)).

The molecular distribution of the obtained test solution was measured using a gel permeation chromatograph, to which a photodiode array (PDA) detector is connected, and two columns (TSK-GEL ALPHA-M 7.8×300 mm each, made by Tosoh Corporation) provided in a polymer material analysis instrument ("Waters Alliance 2695, 2414 (refractometer), 2996 (PDA)" made by Waters Corporation). Accordingly, a chromatogram was obtained (step II)). The measurements were conducted at a flow rate of 0.6 mL/min and a column temperature of 40° C.

Next, from the obtained chromatogram, the retention time was converted to weight (M) in terms of sodium polystyrene sulfonate (step (III)). More specifically, standard samples of sodium polystyrene sulfonate with peak molecular weights of 206, 1030, 4210, 13500, 33500, 78400, 158000 and 2350000 respectively are used. The same as the test solution, standard solutions are each prepared to have a solid concentration of 0.05% by mass, except that the standard sample with a peak molecular weight of 206 is solidified. Then, the relationship between the retention time and the molecular weight of each standard solution is obtained by GPC, and a calibration curve is prepared. Based on the calibration curve, the retention time is converted to molecular weight (M) in terms of sodium polystyrene sulfonate according to the chromatogram obtained in step (II).

Then, area (X) of a region with a molecular weight (M) of 15000 Da or more and area (Y) of a region with a molecular weight of less than 15000 Da were each obtained (steps (IV), (V)). Area ratio (X/Y) of area (X) to area (Y) was obtained (step (VI)).

Salt Content in Conductive Polymer

The amount of the basic compound that forms a salt in the conductive polymer was measured by cation exchange chromatography under conditions shown below. The concentration was calculated by comparing the detected peak areas with the peak areas of triethylamine and aqueous ammonia, whose concentrations were known.

Column: TSKgel IC-Cation I/II column (made by Tosoh Corporation)
Eluent: a mixture of a solution containing nitric acid at 1.0 mmol/L and a solution containing acetonitrile at 10% by mass.
Conductive polymer concentration: 1000 ppm by mass.
Flow rate: 0.5 mL/min.
Injection amount: 30 µL
Temperature: 40° C.
Measuring Capacitance & Measuring ESR Using an LCR meter (precision LCR meter E4980A, made by Agilent Technologies), capacitance and ESR were measured by setting a frequency at 120 Hz for capacitance, and at 100 kHz for ESR.
Repeating Unit (Monomer Unit) [Mol] of Conductive Polymer The weight of conductive polymer powder was divided by the molecular weight of a repeating unit of the polymer to obtain a repeating unit (monomer unit) [mol] of the conductive polymer.

If it is a dispersion or solution of a conductive polymer, the dispersion or solution was dried at 100° C. for an hour and the remaining solid amount was used to obtain a repeating unit (monomer unit) [mol] of the conductive polymer, the same as in the measurement of powder.

Analyzing Volume Resistivity & Conductivity

A conductive composition was applied on a glass substrate using a manual spinner (ASC-4000, made by Actes Inc.), dried on a hotplate at 120° C. for 5 minutes, and further dried by heating at 180° C. for 60 minutes to form a conductor (coating film) with an approximate film thickness of 0.1 µm.

The surface resistivity of the obtained conductor was measured at room temperature by attaching a four-pin probe to a resistivity meter, Loresta GP (made by Mitsubishi Chemical Corporation). The film thickness was measured using a nanoscale hybrid microscope VN-8000, made by Keyence Corporation. Then, the film thickness was multiplied by the surface resistivity to obtain volume resistivity. In addition, the inverse number of the volume resistivity was calculated to obtain conductivity.

Evaluation of Coating Film Characteristics

In a 75 mm-diameter watch glass, 2.5 ml of a conductive composition was placed and dried at 150° C. for 30 minutes in an oven to form a coating film. Then, the conditions of the coating film were evaluated by visual observation to see if there was cracking or peeling in the coating film.

Preparation of Conductive Composition

In the following, conductive compositions in examples and comparative examples were prepared by using water as a solvent to set the concentration of conductive polymer (A) at 3~5% by mass.

Melting Point (° C.)

In the following, melting points (° C.) of the compounds in examples and comparative examples were values obtained according to ACROSS ORGANICS (2004, vol. 4), Aldrich (2005-2006, Japan), and the MERCK INDEX (12th edition).

Production Example A1: Preparing Conductive Polymer (A1)

A monomer solution was obtained by dissolving 1 mol of 2-aminoanisole-4-sulfonic acid in 300 ml of 4 mol/L triethylamine solution (water:acetonitrile=3:7) at 0° C.

An oxidizing solution was obtained separately by dissolving 1 mol of ammonium peroxodisulfate in one liter of a solution (water:acetonitrile=3:7).

Next, the monomer solution was dripped into the oxidizing solution while cooling the oxidizing solution at 5° C. After the dripping was completed, the solution was further stirred at 25° C. for 12 hours, and the reaction product was filtered using a centrifugal filter.

In addition, the reaction product was washed with methanol and dried. Accordingly, 185 grams of conductive polymer powder having a repeating unit shown in formula (1) above was obtained (in formula (1), $R^1$ is a sulfonic acid group, $R^2$~$R^3$ are hydrogen atoms and $R^4$ is a methoxy group).

The amount of basic compounds (triethylamine and ammonium) that form salts contained in the obtained conductive polymer was 16.7% by mass.

A conductive polymer (A1') solution was obtained by dissolving 5 parts by mass of the obtained conductive polymer in 98 parts by mass of water at room temperature.

"Room temperature" is referred to as 25° C.

In a column, 50 parts by mass of acidic cation exchange resin (Amberlite, made by Organo Corporation) per 100 parts by mass of the conductive polymer (A1') solution was filled. Cation exchange treatment was performed by flowing conductive polymer (A1') solution through the column at a flow rate of SV=8. Accordingly, refined conductive polymer (A1) solution was obtained.

In the obtained conductive polymer (A1) solution, the proportion of the conductive polymer was 4.5% by mass; and the amount of basic compounds (triethylamine and ammonium) that form salts contained in the conductive polymer (A1) solution was 0.1% by mass or less.

In addition, molecular weight (M) was 24300, and the value of X/Y was 0.98.

Production Example (B1): Preparing Conductive Polymer (A2)

A solution prepared by dissolving 200 mmol of ammonium peroxodisulfate and 1.0 gram of sulfuric acid in 150 ml of a water/acetonitrile mixed solution (volume ratio=1:1) was cooled at 0° C. by an ethyleneglycol bath.
Then, a solution prepared by dissolving 200 mmol of 2-aminoanisole-4-sulfonic acid and 200 mmol of triethylamine in 150 ml of a water/acetonitrile mixed solution (volume ratio=1:1) was dripped at 200 mmol/hr into the above solution by setting the agitation power at 0.7 kw/m$^3$.

After the dripping was completed, the solution was kept cool for two hours while being stirred, and the reaction product was filtered by a vacuum filter under cooling conditions. Then, the reaction product was washed with methyl alcohol and dried. Accordingly, a crude conductive polymer was obtained.

Twenty grams of the obtained crude polymer was dissolved in 400 ml of water, and 100 ml of acid cation exchange resin (Amberlite, made by Organo Corporation) was filled in a column. Then, cation exchange treatment was performed by flowing the crude polymer solution through the column at a flow rate of SV=0.3 to obtain refined conductive polymer (A2) solution.

In the obtained conductive polymer (A2) solution, the proportion of conductive polymer (A2) was 4.5% by mass; and the amount of basic compounds that form salts contained in the obtained conductive polymer was 0.1% by mass or less.

In addition, molecular weight (M) was 34900, and the value of (X/Y) was 1.24.

Production Example C1: Preparing Conductive Polymer (A3)

A solution prepared by dissolving 200 mmol of ammonium peroxodisulfate and 1.0 gram of sulfuric acid in 150 ml of a water/acetonitrile mixed solution (volume ratio=1:1) was cooled at 0° C. by an ethyleneglycol bath. Then, a solution prepared by dissolving 200 mmol of 2-aminoanisole-4-sulfonic acid and 200 mmol of triethylamine in 150 ml of a water/acetonitrile mixed solution (volume ratio=1:1) was dripped at 200 mmol/hr into the above solution by setting the agitation power at 0.7 kw/m$^3$.

After the dripping was completed, the solution was kept cool for two hours while being stirred, and the reaction product was filtered by a vacuum filter under cooling conditions. Then, the reaction product was washed with methyl alcohol and dried. Accordingly, a crude conductive polymer was obtained.

Twenty grams of the obtained crude polymer was dissolved in 400 ml of water, and 100 ml of acidic cation exchange resin (Amberlite, made by Organo Corporation) was filled in a column. Then, acidic cation exchange treatment was performed by flowing the crude polymer solution through the column at a flow rate of SV=0.3 to obtain refined conductive polymer (A3).

Molecular weight (M) was 36800, and the value of (X/Y) was 1.28.

Production Example (D1): Preparing Conductive Polymer (A4)

A solution prepared by dissolving 200 mmol of ammonium peroxodisulfate and 1.0 gram of sulfuric acid in 150 ml of a water/acetonitrile mixed solution (volume ratio=1:1) was cooled at 0° C. by an ethyleneglycol bath. Then, a solution prepared by dissolving 200 mmol of 2-aminoanisole-4-sulfonic acid and 200 mmol of triethylamine in 150 ml of a water/acetonitrile mixed solution (volume ratio=1:1) was dripped at 200 mmol/hr into the above solution under agitation power at 0.7 kw/m$^3$.

After the dripping was completed, the solution was kept cool for two hours while being stirred, and the reaction product was filtered by a vacuum filter under those cooling conditions and washed with methyl alcohol and dried. Accordingly, a crude conductive polymer was obtained.

Twenty grams of the obtained crude polymer was dissolved in 10 L of water to prepare a polymer solution with a solid concentration at 0.2% by mass, which was then treated using an ultrafiltration unit until the solid concentration reached 3% by mass. Then, 100 ml of cation exchange resin (Amberlite, made by Organo Corporation) was filled in a column and the solution treated as above was flowed through the column at a flow rate of SV=0.3 to obtain refined conductive polymer (A4).

Molecular weight (M) was 43600, and the value of (X/Y) was 1.51.

Production Example (E1): Preparing Conductive Polymer (A5)

Using the same method for above production example (A1), 185 grams of conductive polymer powder having a repeating unit shown in formula (1) above was obtained (in formula (1), $R^1$ is a sulfonic acid group, $R^2$~$R^3$ are hydrogen atoms and $R^4$ is a methoxy group).

The amount of basic compounds (triethylamine and ammonium) that form salts contained in the obtained conductive polymer was 16.7% by mass.

A conductive polymer (A5') solution was obtained by dissolving 5 parts by mass of the obtained conductive polymer in 98 parts by mass of water at room temperature. Room temperature is referred to as 25° C.

In a column, 50 parts by mass of acidic cation exchange resin (Amberlite, made by Organo Corporation) per 100 parts by mass of the conductive polymer (A5') solution was filled. Acidic cation exchange treatment was performed by flowing conductive polymer (A5') solution through the column at a flow rate of SV=8. Accordingly, refined conductive polymer (A5) solution was obtained.

In the obtained conductive polymer (A5) solution, the proportion of the conductive polymer was 4.5% by mass; and the amount of basic compounds (triethylamine and ammonium) that form salts contained in the obtained conductive polymer was 0.1% by mass or less.

In addition, molecular weight (M) was 21600, and the value of (X/Y) was 0.89.

Production Example (F1): Preparing Conductive Polymer (A6)

A monomer solution was obtained by dissolving 1 mol of 2-aminoanisole-4-sulfonic acid in 300 ml of 4 mol/L triethylamine solution (water:acetonitrile=3:7) at 0° C.

An oxidizing solution was obtained separately by dissolving 1 mol of ammonium peroxodisulfate in one liter of a solution (water/acetonitrile=3:7).

Next, the monomer solution was dripped into the oxidizing solution while the oxidizing solution was being cooled at 5° C. After the dripping was completed, the solution was further stirred at 25° C. for 12 hours, and the reaction product was filtered using a centrifugal filter.

Moreover, the reaction product was washed with methanol and dried, and 185 grams of conductive polymer powder having a repeating unit shown in formula (1) above was obtained (in formula (1), $R^1$ is a sulfonic acid group, $R^2 \sim R^3$ are hydrogen atoms and $R^4$ is a methoxy group).

The amount of basic salt (triethylamine and ammonia) that forms a salt contained in the obtained conductive polymer was 16.7% by mass.

A conductive polymer (A6') solution was obtained by dissolving 5 parts by mass of the obtained conductive polymer in 95 parts by mass of water at room temperature.

"Room temperature" is referred to as 25° C.

In a column, 50 parts by mass of acidic cation exchange resin (Amberlite made by Organo Corporation) per 100 parts by mass of the conductive polymer (A6') solution was filled. Cation exchange treatment was performed by flowing conductive polymer (A6') solution through the column at a flow rate of SV=8. Accordingly, refined conductive polymer (A6) solution was obtained.

In the obtained conductive polymer (A6) solution, the proportion of the conductive polymer was 4.5% by mass (4.7 parts by mass to 100 parts by mass of the solvent); and the amount of basic compounds (triethylamine and ammonium) that form basic salts contained in the conductive polymer (A1) solution was 0.1% by mass or less.

In addition, molecular weight (M) was 21800, and the value of (X/Y) was 1.11.

<Conductive Composition Containing Conductive Polymer (A) and Compound (B) Above>

Examples 1-1~1-9

Conductive composition solutions were respectively prepared by using a solution of conductive polymer (A2) obtained in production example (B1) and by adding alkali metal hydroxide (B) ([examples 1-1~1-8]) or alkaline earth metal hydroxide (B) ([example 1-9]) as a basic compound, at a mixing rate shown in Table 1 per one monomer unit of the conductive polymer.

The prepared conductive composition solutions were each applied on a glass substrate using a spin coater, dried on a hotplate at 120° C. for 5 minutes, and thermally treated at 180° C. for 60 minutes to form conductors. The volume resistivity and conductivity of each obtained conductor are shown in Table 1.

Comparative Examples 1-1~1-3

Conductive composition solutions were respectively prepared by using a solution of conductive polymer (A2) and by adding a basic compound, other than alkali metal hydroxides or alkaline earth metal hydroxides, at a mixing rate shown in Table 1 per one monomer unit of the conductive polymer.

The prepared conductive composition solutions were each applied on a glass substrate using a spin coater, dried on a hotplate at 120° C. for 5 minutes, and thermally dried at 180° C. for 60 minutes to form conductors. The volume resistivity and conductivity of each obtained conductor are shown in Table 1.

TABLE 1

| | compound (B) | amount of compound (B) (per repeating unit 1 mol of conductive polymer) [mol] | volume resistivity (Ω · cm) 120° C. × 5 min | volume resistivity (Ω · cm) 180° C. × 60 min | conductivity [S/cm] | heat resistance evaluation |
|---|---|---|---|---|---|---|
| example 1-1 | lithium hydroxide LiOH | 0.2 | 0.08 | 11.1 | 0.09 | B |
| example 1-2 | lithium hydroxide LiOH | 0.5 | 0.19 | 0.9 | 0.95 | A |
| example 1-3 | sodium hydroxide NaOH | 0.2 | 0.07 | 9.1 | 0.11 | B |
| example 1-4 | sodium hydroxide NaOH | 0.5 | 0.21 | 1.5 | 0.69 | A |
| example 1-5 | potassium hydroxide KOH | 0.2 | 0.07 | 9.9 | 0.10 | B |
| example 1-6 | potassium hydroidde KOH | 0.5 | 0.19 | 1.6 | 0.61 | A |
| example 1-7 | cesium hydroxide CsOH | 0.2 | 0.08 | 12.5 | 0.08 | B |
| example 1-8 | cesium hydroxide CsOH | 0.5 | 0.21 | 1.8 | 0.57 | A |
| example 1-9 | magnesium hydroxide Mg(OH)$_2$ | 0.25 | 0.24 | 2.4 | 0.41 | A |
| comparative example 1-1 | — | 0 | 0.05 | 156.3 | 0.01 | C |
| comparative example 1-2 | triethylamine | 0.5 | 0.14 | 43.5 | 0.02 | C |
| comparative example 1-3 | aqueous ammonia | 0.5 | 0.12 | 81.3 | 0.01 | C |

Evaluations of heat resistance in Table 1 were conducted according to criteria 1 and 2 below.
(Heat Resistance Evaluation Criteria 1)
A: Relative to the volume resistivity after thermal drying at 120° C. for 5 minutes, the volume resistivity upon further thermal drying at 180° C. for 60 minutes shows an increase less than 100 times as high.
B: Relative to the volume resistivity after thermal drying at 120° C. for 5 minutes, the volume resistivity upon further thermal drying at 180° C. for 60 minutes shows an increase of at least 100 times as high, but less than 250 times as high.
C: Relative to the volume resistivity after thermal drying at 120° C. for 5 minutes, the volume resistivity upon further thermal drying at 180° C. for 60 minutes shows an increase of at least 250 times as high.

(Heat Resistance Evaluation Criteria 2)
A: Relative to the base conductivity of [comparative example 1-1], the conductivity is at least 20 times as high.
B: Relative to the base conductivity of [comparative example 1-1], the conductivity is at least 3 times as high but less than 20 times as high.
C: Relative to the base conductivity of [comparative example 1-1], the conductivity is less than 3 times as high.

Heat resistance evaluation based on evaluation criteria 1 and 2 showed the same results in the comparative examples as shown in Table 1.

Regarding examples 1-1~1-8 in which an alkali metal hydroxide was added, and example 1-9 in which an alkaline earth metal hydroxide was added, it is found from Table 1 that conductivities did not decrease after thermal treatment and that the conductors each showed excellent conductivity and heat resistance even after thermal treatment.

By contrast, regarding comparative example 1-1 without any basic compound, or comparative examples 1-2 and 1-3 prepared by adding a basic compound other than alkali metal hydroxides or alkaline earth metal hydroxides, conductivities after thermal treatment were lowered, and the conductors after thermal treatment showed poor conductivity and heat resistance relative to those of the examples.

In addition, the relationships between the amount of compound (B) in a conductive composition and the volume resistivity and conductivity of each of the obtained conductors are shown in Table 2. Lithium hydroxide was used as an example of compound (B).

When preparing conductive composition solutions and forming conductors, the same methods and conditions apply as in examples 1-1~1-9.

TABLE 2

|  | amount of lithium hydroxide (LiOH) (per repeating unit 1 mol of conductive polymer) [mol] | volume resistivity ($\Omega \cdot cm$) | | conductivity [S/cm] |
|---|---|---|---|---|
|  |  | 120° C. × 5 min | 180° C. × 60 min |  |
| example 1-1 | 0.2 | 0.08 | 11.1 | 0.09 |
| example 1-10 | 0.3 | 0.13 | 5.62 | 0.18 |
| example 1-11 | 0.4 | 0.16 | 1.64 | 0.52 |
| example 1-2 | 0.5 | 0.19 | 0.9 | 0.95 |
| example 1-12 | 0.6 | 0.26 | 0.59 | 1.48 |
| comparative example 1-4 | 0.0 | 0.05 | 156.3 | 0.01 |
| comparative example 1-5 | 0.7 | 0.32 | 6.48 | 0.05 |
| comparative example 1-6 | 1.0 | 935 | 1205 | 0.001 |

From Table 2, it is found that conductivities did not decrease after thermal treatment in examples 1-1, 1-2, 1-10, 1-11 and 1-12 in which conductive compositions containing 0.2~0.6 mol of lithium hydroxide were used.

By contrast, in comparative example 1-4 prepared without lithium hydroxide, and comparative examples 1-5 and 1-6 prepared using conductive compositions containing 0.7 mol~1.0 mol of lithium hydroxide, conductivities decreased after thermal treatment.

Examples 1-13, 1-14

Conductive compositions were prepared by using a solution of conductive polymer (A1) obtained in production example (A1) and a solution of conductive polymer (A2) obtained in production example (B1) and by adding lithium hydroxide as an example of alkali metal hydroxides at a mixing rate shown in Table 3 below per one monomer unit of the conductive polymer.

The prepared conductive composition solutions were each applied on a glass substrate using a spin coater, dried on a hotplate at 120° C. for 5 minutes, and further thermally dried at 180° C. for 60 minutes to form conductors. The volume resistivities and conductivities of the obtained conductors are both shown in Table 3.

TABLE 3

|  | conductive polymer (X/Y) | added compound (B) | amount (per repeating unit 1 mol of conductive polymer) [mol] | conductivity (after heating at 180° C. × 60 min) [S/cm] |
|---|---|---|---|---|
| example 1-1 | 1.24 | lithium hydroxide | 0.2 | 0.09 |
| example 1-2 | 1.24 | lithium hydroxide | 0.5 | 0.95 |
| example 1-13 | 0.98 | lithium hydroxide | 0.2 | 0.07 |
| example 1-14 | 0.98 | lithium hydroxide | 0.5 | 0.85 |

When examples are compared in terms of area ratio (X/Y) of conductive polymer (A) obtained by GPC, it is found from Table 3 that after thermal treatment, conductivities were higher in examples 1-1 and 1-2 prepared by using conductive polymer (A2) with area ratio (X/Y) of 1.20 or greater relative to the conductivities of examples 1-13 and 1-14 prepared by using conductive polymer (A1) with area ratio (X/Y) of 1.20 or lower.

<Conductive Composition Containing Conductive Polymer (A) and Compound (C) Above>

Examples 2-1~2-14

Conductive composition solutions were respectively prepared by using a solution of conductive polymer (A2) obtained in production example (B1) and by adding alkali metal salts and/or alkaline earth metal salts (C) at a mixing rate shown in Table 4 per 1 mol of a repeating unit (monomer unit) of the conductive polymer.

The prepared conductive composition solutions were each applied on a glass substrate using a spin coater, dried on a hotplate at 120° C. for 10 minutes, and thermally treated further at 180° C. for 60 minutes to form conductors. The resistivities and conductivities of the obtained conductors are shown in Table 4.

Comparative Example 2-1

Conductive polymer (A2) solution was applied on a glass substrate using a spin coater, dried on a hotplate at 120° C. for 10 minutes, and thermally treated further at 180° C. for 60 minutes to form conductors. The conductivity of the obtained conductor is shown in Table 4.

Comparative Examples 2-2~2-3

Conductive composition solutions were respectively prepared by using conductive polymer (A2) solution and by adding triethylamine and aqueous ammonia respectively as a basic compound at a mixing rate shown in Table 4 per 1 mol of a repeating unit (monomer unit) of the conductive polymer.

The prepared conductive composition solutions were each applied on a glass substrate using a spin coater, dried on a hotplate at 120° C. for 10 minutes, and thermally treated further at 180° C. for 60 minutes to form conductors. The conductivities of the obtained conductors are shown in Table 4.

TABLE 4

| | added compound (C) | amount (per repeating unit 1 mol of conductive polymer) [mol] | conductivity (after heating at 180° C. × 60 min) [S/cm] | heat resistance evaluation |
|---|---|---|---|---|
| example 2-1 | lithium acetate | 0.25 | 0.17 | B |
| example 2-2 | lithium acetate | 0.5 | 1.06 | A |
| example 2-3 | sodium acetate | 0.25 | 0.19 | B |
| example 2-4 | sodium acetate | 0.5 | 0.83 | A |
| example 2-5 | potassium acetate | 0.25 | 0.13 | B |
| example 2-6 | potassium acetate | 0.5 | 0.47 | A |
| example 2-7 | lithium carbonate | 0.25 | 1.04 | A |
| example 2-8 | sodium carbonate | 0.25 | 0.80 | A |
| example 2-9 | potassium carbonate | 0.25 | 0.21 | A |
| example 2-10 | pentasodium tripolyphosphate | 0.3 | 0.32 | A |
| example 2-11 | lithium bromide | 0.25 | 0.20 | A |
| example 2-12 | lithium bromide | 0.5 | 0.49 | A |
| example 2-13 | lithium bromide | 0.75 | 0.98 | A |
| example 2-14 | lithium bromide | 2 | 0.10 | B |
| comparative example 2-1 | — | — | 0.01 | C |
| comparative example 2-2 | triethylamine | 0.5 | 0.02 | C |
| comparative example 2-3 | aqueous ammonia | 0.5 | 0.01 | C |

Heat resistance evaluations shown in Table 4 were conducted according to the criteria below. In conductivity evaluations, the composition (comparative example 2-1) containing only conductive polymer (A) and solvent (G) was used as a base for comparison.

A: The conductivity is at least 20 times as high as the base conductivity of [Comparative Example 2-1].

B: The conductivity is at least 3 times as high, but less than 20 times as high as the base conductivity of [comparative example 2-1].

C: The conductivity is less than 3 times as high as the base conductivity of [comparative Example 2-1].

From Table 4, it is found that examples 2-1~2-14, which were respectively prepared by adding at least one type of compound (C) selected from acetate, carbonate, phosphate and halide of alkali metals and/or alkaline earth metals, each retain high conductivity even after thermal treatment was conducted at 180° C. for 60 minutes, and exhibit excellent conductivity and heat resistance.

By contrast, after thermal treatment was conducted at 180° C. for 60 minutes, it is found that comparative example 2-1 prepared without compound (C), as well as comparative examples 2-2 and 2-3 prepared by adding triethylamine or ammonia instead of compound (C), has lower conductivity and heat resistance than the examples.

Examples 2-1~2-4, Examples 2-15~18

Conductive compositions were respectively prepared by using a solution of conductive polymer (A1) obtained in production example (A1) and a solution of conductive polymer (A2) obtained in production example (B1) and by adding lithium acetate and sodium acetate as examples of compound (C) at a mixing rate shown in Table 5 per one monomer unit of the conductive polymer.

The prepared conductive composition solutions were each applied on a glass substrate using a spin coater, dried on a hotplate at 120° C. for 5 minutes, and thermally dried further at 180° C. for 60 minutes to form conductors. The volume resistivities and conductivities of the obtained conductors are both shown in Table 5.

TABLE 5

| | conductive polymer (X/Y) | added compound (C) | amount (per repeating unit 1 mol of conductive polymer) [mol] | conductivity (after heating at 180° C. × 60 min) [S/cm] |
|---|---|---|---|---|
| example 2-1 | 1.24 | lithium acetate | 0.25 | 0.17 |
| example 2-2 | 1.24 | lithium acetate | 0.5 | 1.06 |
| example 2-3 | 1.24 | sodium acetate | 0.25 | 0.19 |
| example 2-4 | 1.24 | sodium acetate | 0.5 | 0.83 |
| example 2-15 | 0.98 | lithium acetate | 0.25 | 0.14 |
| example 2-16 | 0.98 | lithium acetate | 0.5 | 0.90 |
| example 2-17 | 0.98 | sodium acetate | 0.25 | 0.16 |
| example 2-18 | 0.98 | sodium acetate | 0.5 | 0.73 |

When examples are compared in terms of area ratio (X/Y) of conductive polymer (A) analyzed by GPC, it is found in Table 5 that conductivity after thermal treatment was higher in examples 2-1~2-4 prepared by using conductive polymer (A2) with area ratio (X/Y) of 1.20 or greater, relative to conductivity in examples 2-15~2-18 prepared using conductive polymer (A1) with area ratio (X/Y) of 1.20 or lower.

<Conductive Composition Containing Conductive Polymer (A) and Compound (D) Above>

Examples 3-1~3-17

Conductive composition solutions were respectively prepared by using a solution of conductive polymer (A6)

obtained in production example (F1) and by adding compound (D), containing a basic group and at least two hydroxyl groups in the same molecule and having a melting point of 30° C. or higher at a rate shown in Table 6 per 1 mol of a repeating unit (monomer unit) of the conductive polymer.

The prepared conductive composition solutions were each applied on a glass substrate using a spin coater, dried on a hotplate at 120° C. for 10 minutes, and thermally treated at 160° C. for 60 minutes to form conductors. The conductivities of the obtained conductors are shown in Table 6.

In a 75 mm-diameter watch glass, 2.5 ml of the conductive composition solution obtained in example 3-2 in Table 6 was placed and dried at 150° C. for 30 minutes in an oven to form a coating film. Then, the conditions of the coating film were evaluated by observing whether cracking or peeling occurred in the coating film. The results are shown in Table 7.

Comparative Example 3-1

Conductive polymer (A6) solution was applied on a glass substrate using a spin coater, dried on a hotplate at 120° C. for 10 minutes, and thermally treated at 160° C. for 60 minutes to form a conductor. The conductivity of the obtained conductor is shown in Table 6.

In a 75 mm-diameter watch glass, 2.5 ml of the conductive polymer (A6) solution was placed and dried at 150° C. for 30 minutes in an oven to form a coating film. Then, the conditions of the coating film were evaluated by observing whether cracking or peeling occurred in the coating film. The results are shown in Table 7.

Comparative Examples 3-2~3-4

Using conductive polymer (A6) solution, conductive composition solutions were respectively prepared by adding aqueous ammonia and triethylamine as compounds having only a basic group and 2-methoxyethanol as a compound having only a hydroxyl group at a rate shown in Table 6 per 1 mol of one repeating unit (monomer unit) of the conductive polymer.

The prepared conductive composition solutions were each applied on a glass substrate using a spin coater, dried on a hotplate at 120° C. for 10 minutes, and thermally treated at 160° C. for 60 minutes to form conductors. The conductivities of the obtained conductors are shown in Table 6.

TABLE 6

| | added compound | amount (per repeating unit 1 mol of conductive polymer) [mol] | conductivitly [S/cm] | heat resistance evaluation | melting point(° C.) |
|---|---|---|---|---|---|
| example 3-1 | 2-amino-1,3-propane diol | 0.3 | 1.20 | A | 52-56 |
| example 3-2 | tris(hydroxymethyl)aminomethane <tris base> | 0.3 | 1.26 | A | 167-172 |
| example 3-3 | tris(hydroxymethyl)aminomethane <tris base> | 0.5 | 0.94 | A | 167-172 |
| example 3-4 | 2-amino-2-methyl-1,3-propanediol | 0.3 | 0.88 | A | 100-110 |
| example 3-5 | 2-amino-2-ethyl-1,3-propane diol | 0.3 | 0.74 | A | 100-110 |
| example 3-6 | N,N-di(2-hydroxyethyl)glycine | 0.3 | 0.31 | B | 190 |
| example 3-7 | 3-[N-tris(hydroxymethyl)methylamino]-2-hydroxypropanesulfonic acid | 0.3 | 1.16 | A | 224-229 |
| example 3-8 | N-tris(hydroxymethyl)methyl-2-aminoethanesulfonic acid | 0.3 | 0.57 | A | 220 |
| comparative example 3-1 | — | 0 | 0.06 | C | — |
| comparative example 3-2 | triethylamine | 0.5 | 0.06 | C | −115 |
| comparative example 3-3 | $NH_3$aq | 0.5 | 0.09 | C | −77.7 |
| comparative example 3-4 | 2-methoxyethanol | 0.5 | 0.10 | C | −85 |

Heat resistance evaluations shown in Table 6 were conducted according to the criteria below. In conductivity evaluations, the composition (comparative example 3-1) containing only conductive polymer (A) and solvent (G) was used as a base for comparison.

A: The conductivity is at least 10 times as high as the base conductivity of [Comparative Example 3-1].

B: The conductivity is at least twice as high, but less than 10 times as high as the base conductivity of [comparative example 3-1].

C: The conductivity is less than twice as high as the base conductivity of [comparative example 3-1].

From Table 6, it was confirmed that in examples 3-1~3-8 prepared by adding compound (D) containing a basic group and at least two hydroxyl groups in the same molecule and having a melting point of 30° C. or higher, conductors were found to retain high conductivity even after being heated at 160° C. for 60 minutes and to exhibit excellent conductivity and heat resistance.

By contrast, in comparative example 3-1 without compound (D), comparative example 3-2~3-3 in which a compound having only a basic group was added, and comparative example 3-4 in which a compound having only a hydroxyl group was added, conductors were found to have lower conductivity and heat resistance compared with the examples after thermal treatment at 160° C. for 60 minutes.

TABLE 7

| | added compound | amount (per repeating unit 1 mol of conductive polymer) [mol] | cracking of coating film | peeling of coating film |
|---|---|---|---|---|
| example 3-9 | tris(hydroxymethyl)aminomethane | 0.3 | none | none |
| comparative example 3-6 | — | 0 | observed | observed |

From Table 7, in example 3-9 prepared by adding compound (D) containing a basic group and at least two hydroxyl groups in the same molecule and having a melting point of 30° C. or higher, the coating film remained excellent even after thermal drying at 150° C. for 30 minutes, and excellent coating properties were exhibited.

By contrast, regarding comparative example 3-6 without compound (D), cracking and peeling were observed in the coating film after thermal drying at 150° C. for 30 minutes. Coating properties were found to be poor compared with the examples.

From the above results, it is found that conductors having excellent heat resistance as well as excellent coating properties are obtained according to the embodiments of the present invention.

Examples 3-10~3-12

Using a solution of conductive polymer (A4) obtained in production example (D1) and a solution of conductive polymer (A6) obtained in production example (F1), conductive compositions were respectively prepared by adding tris(hydroxymethyl)aminomethane and 2-amino-2-methyl-1,3-propanediol as examples of compound (D) at a mixing rate shown in Table 8 below per one monomer unit of the conductive polymers.

The prepared conductive composition solutions were each applied on a glass substrate using a spin coater, dried on a hotplate at 120° C. for 5 minutes, and thermally dried at 180° C. for 60 minutes to form conductors. The volume resistivities and conductivities of the conductors are shown in Table 8.

<Conductive Composition Containing Conductive Polymer (A) and Compound (E) Above>

Examples 4-1~4-22

Using a solution of conductive polymer (A5) obtained in production example (E1), conductive compositions were respectively prepared by adding a compound (E) containing in the same molecule at least one each of an acidic group and a basic group at a mixing rate shown in Table 9 per 1 mol of a repeating unit (monomer unit) of the conductive polymer.

The prepared conductive composition solutions were each applied on a glass substrate using a spin coater, dried on a hotplate at 120° C. for 10 minutes, and thermally treated at 160° C. for 60 minutes to form conductors. The conductivities of the conductors is shown in Table 9.

Comparative Example 4-1

Conductive polymer (A5) solution was applied on a glass substrate using a spin coater, dried on a hotplate at 120° C. for 10 minutes, and thermally treated at 160° C. for 60 minutes to form a conductor. The conductivity of the conductor is shown in Table 9.

Comparative Examples 4-2~4-5

Using conductive polymer (A5) solution, conductive compositions were respectively prepared by adding aqueous ammonia and triethylamine as compounds having only a basic group as well as acetic acid and p-toluenesulfonic acid

TABLE 8

| | conductive polymer (X/Y) | added compound (C) | amount (per repeating unit 1 mol of conductive polymer) [mol] | conductivity (after heating at 180° C. × 60 min) [S/cm] |
|---|---|---|---|---|
| example 3-10 | 1.51 | tris(hydroxymethyl)aminomethane | 0.3 | 1.51 |
| example 3-11 | 1.51 | tris(hydroxymethyl)aminomethane | 0.5 | 1.22 |
| example 3-12 | 1.51 | 2-amino-2-methyl-1,3-propanediol | 0.3 | 1.14 |
| example 3-2 | 1.11 | tris(hydroxymethyl)aminomethane | 0.3 | 1.26 |
| example 3-3 | 1.11 | tris(hydroxymethyl)aminomethane | 0.5 | 0.94 |
| example 3-4 | 1.11 | 2-amino-2-methyl-1,3-propanediol | 0.3 | 0.88 |

When examples are compared in terms of area ratio (X/Y) of conductive polymer (A) analyzed by GPC, it is found from Table 8 that conductivity after heating was higher in examples 3-10~3-12 prepared by using conductive polymer (A4) with area ratio (X/Y) of 1.20 or greater, relative to conductivity in examples 3-2~3-4 prepared by using conductive polymer (A6) with area ratio (X/Y) of 1.20 or lower.

as compounds having only an acidic group, at a mixing rate shown in Table 9 per 1 mol of a repeating unit (monomer unit) of the conductive polymer.

The prepared conductive composition solutions were each applied on a glass substrate using a spin coater, dried on a hotplate at 120° C. for 10 minutes, and thermally treated at 160° C. for 60 minutes to form conductors. The conductivities of the conductors are shown in Table 9.

TABLE 9

| | added compound | amount (per repeating unit 1 mol of conductive polymer) [mol] | conductivity [S/cm] | heat resistance evaluation |
|---|---|---|---|---|
| example 4-1 | L-cysteic acid | 0.3 | 0.45 | A |
| example 4-2 | L-cysteic acid | 0.6 | 0.58 | A |
| example 4-3 | L-serine | 0.3 | 0.66 | A |
| example 4-4 | L-serine | 0.6 | 0.20 | B |
| example 4-5 | L-aspartic acid | 0.3 | 0.29 | A |
| example 4-6 | L-aspartic acid | 0.6 | 0.17 | B |
| example 4-7 | β-alanine | 0.3 | 0.23 | B |
| example 4-8 | 2-aminoethanesulfonic acid | 0.3 | 0.25 | A |
| example 4-9 | glycine | 0.3 | 0.29 | A |
| example 4-10 | L-alanine | 0.3 | 0.28 | A |
| example 4-11 | 4-aminobutyric acid | 0.3 | 0.16 | B |
| example 4-12 | L-lysine | 0.1 | 0.15 | B |
| example 4-13 | L-arginene | 0.1 | 0.17 | B |
| example 4-14 | L-histidine | 0.1 | 0.14 | B |
| example 4-15 | L-homoserine | 0.3 | 0.33 | A |
| example 4-16 | sarcosine | 0.3 | 0.21 | B |
| example 4-17 | iminodiacetic acid | 0.3 | 0.18 | B |
| example 4-18 | 2-(4-hydroxyphenyl)glycine | 0.3 | 0.22 | B |
| example 4-19 | L-threonine | 0.3 | 0.39 | A |
| example 4-20 | L-isoserine | 0.3 | 0.38 | A |
| example 4-21 | L-prolinol | 0.3 | 0.65 | A |
| example 4-22 | tyramine | 0.3 | 0.42 | B |
| comparative example 4-1 | — | 0 | 0.05 | C |
| comparative example 4-2 | triethylamine | 0.5 | 0.05 | C |
| comparative example 4-3 | NH3aq | 0.5 | 0.09 | C |
| comparative example 4-4 | acetic acid | 0.5 | 0.07 | C |
| comparative example 4-5 | p-toluenesulfonic acid | 0.5 | 0.02 | C |

Heat resistance evaluations shown in Table 9 were conducted according to the criteria below.
A: The conductivity is at least 5 times as high as the base conductivity of [comparative example 4-1].
B: The conductivity is at least twice as high but less than 5 times as high as the base conductivity of [comparative example 4-1].
C: The conductivity is less than twice as high as the base conductivity of [comparative example 4-1].

From Table 9, in example 4-1~4-22 prepared by adding compound (E) containing in the same molecule at least one each of an acidic group and a basic group, high conductivity was retained even after heating at 160° C. for 60 minutes. Excellent conductivity and heat resistance were exhibited.

By contrast, regarding comparative example 4-1 without compound (D) containing in the same molecule at least one each of an acidic group and a basic group, comparative examples 4-2 and 4-3 with an added compound having only a basic group, and comparative examples 4-4 and 4-5 with an added compound having only an acidic group, conductivity was low after thermal treatment at 160° C. for 60 minutes. Compared with the examples, lower conductivity and heat resistance were observed.

Examples 4-1~4-4, Examples 4-23~4-26

Using a solution of conductive polymer (A4) obtained in production example (D1) and a solution of conductive polymer (A5) obtained in production example (E1), conductive compositions were respectively prepared by adding L-cysteic acid and L-serine as examples of compound (E), at a mixing rate shown in Table 10 per one monomer unit of the conductive polymer.

The prepared conductive composition solutions were each applied on a glass substrate using a spin coater, dried on a hotplate at 120° C. for 5 minutes, and thermally dried further at 180° C. for 60 minutes to form conductors. The volume resistivity and conductivities of the conductors are shown in Table 10.

TABLE 10

| | conductive polymer (X/Y) | added compound (C) | amount (per repeating unit 1 mol of conductive polymer) [mol] | conductivity (after heating at 180° C. × 60 min) [S/cm] |
|---|---|---|---|---|
| example 4-23 | 1.51 | L-cysteic acid | 0.3 | 1.88 |
| example 4-24 | 1.51 | L-cysteic acid | 0.6 | 2.24 |
| example 4-25 | 1.51 | L-serine | 0.3 | 1.37 |
| example 4-26 | 1.51 | L-serine | 0.6 | 0.80 |

TABLE 10-continued

|  | conductive polymer (X/Y) | added compound (C) | amount (per repeating unit 1 mol of conductive polymer) [mol] | conductivity (after heating at 180° C. × 60 min) [S/cm] |
|---|---|---|---|---|
| example 4-1 | 0.89 | L-cysteic acid | 0.3 | 0.45 |
| example 4-2 | 0.89 | L-cysteic acid | 0.6 | 0.58 |
| example 4-3 | 0.89 | L-serine | 0.3 | 0.66 |
| example 4-4 | 0.89 | L-serine | 0.6 | 0.20 |

When examples are compared in terms of area ratio (X/Y) of conductive polymer (A) analyzed by GPC, it is found from Table 10 that conductivity after heating was higher in examples 4-23~4-26 prepared by using conductive polymer (A4) with area ratio (X/Y) of 1.20 or greater, relative to conductivity in examples 4-1 and 4-4 prepared by using conductive polymer (A5) with area ratio (X/Y) of 1.20 or lower.

<Conductive Composition Containing Conductive Polymer (A) and/or Compound (F) Above>

Examples 5-1~5-17

Using a solution of conductive polymer (A4) obtained in production example (D1), conductive compositions were respectively prepared by adding a compound (F) containing in the same molecule at least two carboxylic acids or their salts, at a mixing rate shown in Table 11 per 1 mol of a monomer unit of the conductive polymer.

The prepared conductive composition solutions were each applied on a glass substrate using a spin coater, heated and dried on a hotplate at 120° C. for 10 minutes, or at 180° C. for 60 minutes, to form conductors. The conductivities of the conductors are shown in Table 11 or 12.

Comparative Examples 5-1~5-4

Using conductive polymer (A4) solution, conductive compositions were respectively prepared by the same method as in the examples except that an acidic compound was added at a mixing rate shown in Table 11 or 12 per 1 mol of a monomer unit of the conductive polymer.

The conductivities of the obtained conductors are shown in Table 11 or 12.

Heat resistance evaluations shown in Table 11 were conducted according to the criteria below.

A: The conductivity after thermal drying at 120° C. for 10 minutes is 20 S/cm or higher.

B: The conductivity after thermal drying at 120° C. for 10 minutes is 10 S/cm or higher but lower than 20 S/cm.

C: The conductivity after thermal drying at 120° C. for 10 minutes is lower than 10 S/cm.

From Table 11, it was found that examples 5-1~5-8, each prepared using a conductive composition containing compound (F) having at least two carboxylic acids or their salts in the same molecule, showed conductivity of 10 S/cm or higher even after thermal treatment was conducted at 120° C. for 10 minutes. Excellent heat resistance and conductivity were exhibited.

By contrast, comparative example 5-1 without compound (F), and comparative examples 5-2 and 5-3 containing in the same molecule a compound having one carboxylic acid, showed conductivity lower than 10 S/cm after thermal treatment was conducted at 120° C. for 10 minutes. Heat resistance and conductivity were found to be low.

TABLE 11

|  | added compound | amount (per repeating unit 1 mol of conductive polymer) [mol] | conductivity [S/cm] 120° C. × 10 min | heat resistance evaluation |
|---|---|---|---|---|
| example 5-1 | oxalic acid | 0.2 | 28.12 | A |
| example 5-2 | oxalic acid | 0.5 | 28.2 | A |
| example 5-3 | oxalic acid | 0.75 | 17.43 | B |
| example 5-4 | oxalic acid | 1 | 17.15 | B |
| example 5-5 | malonic acid | 0.2 | 16.56 | B |
| example 5-6 | succinic acid | 0.2 | 22.15 | A |
| example 5-7 | maleic acid | 0.2 | 16.27 | B |
| example 5.8 | glycolic acid | 0.2 | 18.11 | B |
| comparative example 5-1 | — | — | 7.15 | C |
| comparative example 5-2 | acetic acid | 0.2 | 8.90 | C |
| comparative example 5-3 | p-toluenesulfonic acid | 0.2 | no film formed | C |

TABLE 12

| | added compound | amount (per repeating unit 1 mol of conductive polymer) [mol] | conductivity [S/cm] 180° C. × 60 min | heat resistance evaluation (1) | heat resistance evaluation (2) |
|---|---|---|---|---|---|
| example 5-9 | oxalic acid | 0.2 | 0.049 | C | B |
| example 5-10 | oxalic acid | 0.5 | 0.054 | C | B |
| example 5-11 | oxalic acid | 0.75 | 0.042 | C | B |
| example 5-12 | disodium oxalate | 0.2 | 0.35 | B | A |
| example 5-13 | disodium oxalate | 0.5 | 0.33 | B | A |
| example 5-14 | disodium oxalate | 0.75 | 0.26 | B | A |
| example 5-15 | disodium maleate | 0.2 | 0.58 | A | A |
| example 5-16 | disodium maleate | 0.5 | 0.66 | A | A |
| example 5-17 | disodium maleate | 0.75 | 0.42 | B | A |
| comparative example 5-4 | — | — | 0.005 | D | C |

Heat resistance evaluations (1) shown in Table 12 were conducted according to the criteria below.
A: The conductivity after thermal drying at 180° C. for 60 minutes is 0.5 S/cm or higher.
B: The conductivity after thermal drying at 180° C. for 60 minutes is 0.1 S/cm or higher but lower than 0.5 S/cm.
C: The conductivity after thermal drying at 180° C. for 60 minutes is 0.01 S/cm or higher but lower than 0.1 S/cm.
D: The conductivity after thermal drying at 180° C. for 60 minutes is lower than 0.01 S/cm.

From Table 12, even after conducting thermal treatment at 180° C. for 60 minutes, examples 5-9~5-17 with added compound (F) were found to have higher conductivity than comparative example 5-4 without compound (F).

Especially, after thermal treatment was conducted at 180° C. for 60 minutes, examples 5-12~5-17 containing a carbonate as compound (F) were found to have even higher conductivity than comparative example 5-4.

From the results above, it was found that conductive compositions containing compound (F) had higher conductivity after being heated at high temperature than comparative examples 5-1 and 5-4 not containing compound (F), and comparative examples 5-2 and 5-3 containing other compounds instead of compound (F).

Especially, when a carbonate was used as compound (F), higher conductivity was observed even after thermal treatment was conducted at a higher temperature, compared with a composition without compound (F).

Heat resistance evaluations (2) of examples 5-9~5-17 and comparative examples 5-4 according to the criteria below are shown in Table 12.
A: After thermal drying at 180° C. for 60 minutes, the conductivity is at least 20 times as high as the base conductivity of [comparative example 5-1] after thermal drying at 180° C. for 60 minutes.
B: The conductivity after thermal drying at 180° C. for 60 minutes is at least three times as high but less than 20 times as high as the base conductivity of [comparative example 5-1] after thermal drying at 180° C. for 60 minutes.
C: After thermal drying at 180° C. for 60 minutes, the conductivity is less than three times as high as the base conductivity of [comparative example 5-1] after thermal drying at 180° C. for 60 minutes.

Examples 5-1~5-2, Examples 5-18~5-19

Using a solution of conductive polymer (A1) obtained in production example (A1) and a solution of conductive polymer (A4) obtained in production example (D1), conductive compositions were respectively prepared by adding oxalic acid as an example of compound (F), at a mixing rate shown in Table 13 per one monomer unit of the conductive polymer.

The prepared conductive composition solutions were each applied on a glass substrate using a spin coater, dried on a hotplate at 120° C. for 5 minutes, and thermally dried at 180° C. for 60 minutes to form conductors. The volume resistivities and conductivities of the conductors are shown in Table 13.

TABLE 13

| | conductive polymer (X/Y) | added compound (F) | amount (per repeating unit 1 mol of conductive polymer) [mol] | conductivity (after heating at 180° C. × 60 min) [S/cm] |
|---|---|---|---|---|
| example 5-1 | 1.51 | oxalic acid | 0.2 | 0.049 |
| example 5-2 | 1.51 | oxalic acid | 0.5 | 0.054 |
| example 5-18 | 0.98 | oxalic acid | 0.2 | 0.039 |
| example 5-19 | 0.98 | oxalic acid | 0.5 | 0.03 |

When examples are compared in terms of area ratio (X/Y) of conductive polymer (A) analyzed by GPC, it is found from Table 13 that conductivity after heating was higher in examples 5-1 and 5-2 prepared by using conductive polymer (A4) with area ratio (X/Y) of 1.20 or greater, relative to conductivity in examples 5-18 and 5-19 prepared by using conductive polymer (A1) with area ratio (X/Y) of 1.20 or lower.

<Evaluation of Solid Electrolytic Capacitor>
Evaluation 1 of Solid Electrolytic Capacitors Examples 6-1~6-6

Using a solution of conductive polymer (A3) obtained in production example (C1), conductive composition solutions were respectively prepared by adding alkyl dicarboxylic acid (oxalic acid) [examples 6-1~6-3], or substituted alkyl dicarboxylic acid (L-aspartic acid) [examples 6-4~6-6], as compound (F) containing at least two carboxylic acids or their salts in the molecule, at a mixing rate shown in Table 14 per one monomer unit of the conductor polymer.

After a layer formed by oxidizing the surface of the anode in each of aluminum capacitors was immersed in a conductive composition solution for two minutes and dried at 120° C. for 30 minutes in a hot-air drier, thermal treatment was further conducted at 180° C. for 120 minutes. Accordingly, a conductive polymer layer was formed on the anodic oxide layer. The capacitance and ESR values of the obtained wound-type solid electrolytic capacitors are shown in Table 14.

Comparative Examples 6-1~6-3

Using conductive polymer (A3) solution, solid electrolytic capacitors were respectively formed by the same method as in the examples except that acidic compounds were added at a mixing rate per one monomer unit as shown in Table 14. The capacitance and ESR values of the obtained solid capacitors are shown in Table 14.

further heating at 180° C. for 120 minutes is less than 50%; and compared with the ESR after thermal drying at 120° C. for 30 minutes, an increase of ESR upon further heating at 180° C. for 120 minutes is at least 10 times.

From Table 14, in examples 6-1~6-6 in which dicarboxylic acid was added, it is found that capacitance did not decrease after thermal treatment and ESR did not increase, thus excellent heat resistance was exhibited after thermal treatment.

By contrast, in comparative example 6-1 without dicarboxylic acid, and comparative examples 6-2 and 6-3 in which organic acids other than dicarboxylic acid were added respectively, ESR increased significantly after heating and showed poor heat resistance after the thermal treatment.

Evaluation 2 of Solid Electrolytic Capacitors

Using a solution of conductive polymer (A4) obtained in production example (D1), conductive composition solutions were respectively prepared by adding the following at a mixing rate shown in Table 15 per one monomer unit of the

TABLE 14

| | added compound | amount (per repeating unit 1 mol of conductive polymer) [mol] | capacitance [μF] | | equivalent series resistance [mΩ] | | heat resistance evaluation |
|---|---|---|---|---|---|---|---|
| | | | 120° C. × 30 min | 180° C. × 120 min | 120° C. × 30 min | 180° C. × 120 min | |
| example 6-1 | oxalic acid | 0.1 | 4.55 | 2.56 | 316 | 705 | B |
| example 6-2 | oxalic acid | 0.25 | 5.03 | 2.82 | 267 | 828 | B |
| example 6-3 | oxalic acid | 0.5 | 4.69 | 2.58 | 144 | 1004 | B |
| example 6-4 | L-aspartic acid | 0.1 | 3.05 | 2.75 | 340 | 306 | A |
| example 6-5 | L-aspartic acid | 0.25 | 3.16 | 2.86 | 351 | 294 | A |
| example 6-6 | L-aspartic acid | 0.5 | 3.23 | 3.14 | 336 | 249 | A |
| comparative example 6-1 | — | — | 2.94 | 2.73 | 158 | 2330 | C |
| comparative example 6-2 | acetic acid | 0.5 | 3.15 | 2.69 | 126 | 2874 | C |
| comparative example 6-3 | p-toluenesulfonic acid | 0.5 | 2.88 | 1.79 | 190 | 2609 | C |

Heat resistance evaluations in Table 14 were conducted based on the criteria below.

A: Compared with the capacitance after thermal drying at 120° C. for 30 minutes, a reduction of capacitance upon further heating at 180° C. for 120 minutes is less than 10%; and compared with the ESR after thermal drying at 120° C. for 30 minutes, an increase of ESR upon further heating at 180° C. for 120 minutes is less than 10 times.

B: Compared with the capacitance after thermal drying at 120° C. for 30 minutes, a reduction of capacitance upon further heating at 180° C. for 120 minutes is less than 50%; and compared with the ESR after thermal drying at 120° C. for 30 minutes, an increase of ESR upon further heating at 180° C. for 120 minutes is less than 10 times.

C: Compared with the capacitance after thermal drying at 120° C. for 30 minutes, a reduction of capacitance upon conductive polymer: for examples 7-1~7-13, lithium hydroxide in compound (B), lithium acetate in compound (C), tris(hydroxymethyl)aminomethane in compound (D), oxalic acid in compound (F), and L-aspartic acid in compounds (E) and (F); and for comparative examples 7-1~7-4, nothing, triethylamine, acetic acid or p-toluenesulfonic acid.

After a layer formed by oxidizing the surface of the anode in each of aluminum capacitors was immersed in a conductive composition solution for two minutes and dried at 120° C. for 30 minutes in a hot-air drier, thermal treatment was further conducted at 180° C. for 60 minutes. Accordingly, a conductive polymer layer was formed on the anodic oxide layer. The capacitance and ESR values of the obtained wound-type solid electrolytic capacitors are shown in Table 15.

TABLE 15

| | added compound | amount (per repeating unit 1 mol of conductive polymer) [mol] | capacitance [μF] | | equivalent series resistance [mΩ] | | heat resistance evaluation |
|---|---|---|---|---|---|---|---|
| | | | 120° C. × 30 min | 180° C. × 60 min | 120° C. × 30 min | 180° C. × 60 min | |
| example 7-1 | tris(hydroxymethyl) aminomethane (tris base) | 0.3 | 2.91 | 2.61 | 207 | 373 | A |

TABLE 15-continued

| | added compound | amount (per repeating unit 1 mol of conductive polymer) [mol] | capacitance [μF] 120° C. × 30 min | capacitance [μF] 180° C. × 60 min | equivalent series resistance [mΩ] 120° C. × 30 min | equivalent series resistance [mΩ] 180° C. × 60 min | heat resistance evaluation |
|---|---|---|---|---|---|---|---|
| example 7-2 | tris(hydroxymethyl)aminomethane (tris base) | 0.4 | 2.90 | 2.69 | 219 | 318 | A |
| example 7-3 | tris(hydroxymethyl)aminomethane (tris base) | 0.5 | 2.88 | 2.75 | 225 | 309 | A |
| example 7-4 | oxalic acid | 0.1 | 3.21 | 2.17 | 338 | 458 | B |
| example 7-5 | oxalic acid | 0.25 | 3.66 | 2.39 | 286 | 538 | B |
| example 7-6 | oxalic acid | 0.5 | 3.34 | 2.18 | 254 | 653 | B |
| example 7-7 | L-aspartic acid | 0.1 | 2.82 | 2.33 | 199 | 364 | A |
| example 7-8 | L-aspartic acid | 0.25 | 2.92 | 2.42 | 191 | 375 | A |
| example 7-9 | L-aspartic acid | 0.5 | 2.99 | 2.66 | 162 | 359 | B |
| example 7-10 | lithium hydroxide | 0.25 | 3.10 | 2.58 | 166 | 372 | A |
| example 7-11 | lithium hydroxide | 0.5 | 3.31 | 2.91 | 208 | 331 | A |
| example 7-12 | lithium acetate | 0.25 | 3.33 | 2.54 | 239 | 444 | B |
| example 7-13 | lithium acetate | 0.5 | 3.15 | 2.95 | 182 | 346 | A |
| comparative example 7-1 | — | — | 2.72 | 2.31 | 308 | 1320 | C |
| comparative example 7-2 | $Et_3N$ | 0.5 | 2.75 | 2.33 | 257 | 1293 | C |
| comparative example 7-3 | acetic acid | 0.5 | 2.92 | 2.28 | 135 | 1869 | C |
| comparative example 7-4 | p-toluenesulfonic acid | 0.5 | 2.67 | 1.52 | 203 | 1696 | C |

Heat resistance evaluations in Table 15 were conducted based on the criteria below.
A: Compared with the capacitance after thermal drying at 120° C. for 30 minutes, a reduction of capacitance upon further heating at 180° C. for 60 minutes is less than 20%; and compared with the ESR after thermal drying at 120° C. for 30 minutes, an increase of ESR upon further heating at 180° C. for 60 minutes is less than two times.
B: Compared with the capacitance after thermal drying at 120° C. for 30 minutes, a reduction of capacitance upon further heating at 180° C. for 60 minutes is less than 40%; and compared with the ESR after thermal drying at 120° C. for 30 minutes, an increase of ESR upon further heating at 180° C. for 60 minutes is less than three times.
C: Compared with the capacitance after thermal drying at 120° C. for 30 minutes, a reduction of capacitance upon further heating at 180° C. for 60 minutes is 40% or greater; and compared with the ESR after thermal drying at 120° C. for 30 minutes, an increase of ESR upon further heating at 180° C. for 60 minutes is at least three times.

From Table 15, in examples 7-1~7-13 in which compounds (B)~(F) were respectively added, it is found that capacitance did not decrease after thermal treatment and ESR did not increase, thus excellent heat resistance was exhibited after thermal treatment.

By contrast, in comparative example 7-1 without any of compounds (B)~(F), and comparative examples 7-2 and 7-4 prepared using a compound other than compounds (B)~(F), ESR increased significantly after heating and showed poor heat resistance after thermal treatment.

INDUSTRIAL APPLICABILITY

Since conductive compositions according to the embodiments of the present invention exhibit excellent conductivity and heat resistance, they are especially effective for producing solid electrolytic capacitors or the like.

DESCRIPTION OF NUMERICAL REFERENCES x region (x)
y region (y)
20 solid electrolytic capacitor
21 anode
22 cathode
23 separator
24 external terminal

The invention claimed is:

1. A conductive composition, comprising:
a conductive polymer (A); and
a compound (D) which comprises a basic group and at least two hydroxy groups in the same molecule and whose melting point is 30° C. or higher, the compound (D) being selected from 2-amino-1,3-propanediol, tris(hydroxymethyl)aminomethane, 2-amino-2-methyl-1,3-propanediol, 2-amino-2-ethyl-1,3-propanediol, 3[N-tris(hydroxymethyl)methylamino]-2-hydroxypropanesulfonic acid, N-tris(hydroxymethyl)methyl-2-aminoethanesulfonic acid, and combinations thereof;
wherein:
the conductive polymer (A) has a repeating unit of formula (1):

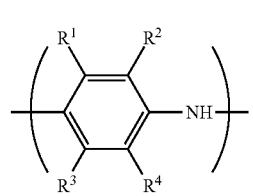

(1)

wherein:
one of $R^1$ to $R^4$ is a linear or branched alkoxy group having 1 to 4 carbon atoms;
one of $R^1$ to $R^4$ is a sulfonic acid group; and
two of $R^1$ to $R^4$ are hydrogen.

2. The conductive composition of claim 1, wherein the conductive polymer (A) has an area ratio (X/Y) of 1.20 or greater, calculated by an analytical method comprising:
- (I) preparing a test solution by dissolving the conductive polymer (A) at a solid concentration of 0.1% by mass in an eluent prepared to have a pH value of 10 or greater;
- (II) obtaining a gel permeation chromatogram by measuring a molecular-weight distribution of the test solution using a gel permeation chromatograph of a polymer material analysis instrument;
- (III) based on the chromatogram obtained in (II) above, converting a retention time to molecular weight (M) in terms of sodium polystyrene sulfonate;
- (IV) determining an area (X) of a region where the molecular weight (M) in terms of sodium polystyrene sulfonate is 15000 Da or greater;
- (V) determining an area (Y) of a region where the molecular weight (M) in terms of sodium polystyrene sulfonate is less than 15000 Da; and
- (VI) calculating the area ratio (X/Y) of area (X) to area (Y).

3. A conductor comprising the conductive composition of claim 2.

4. A solid electrolytic capacitor comprising the conductive composition of claim 2.

5. The conductive composition of claim 2, wherein the compound (D) is 2-amino-1,3-propanediol.

6. The conductive composition of claim 2, wherein the compound (D) is tris(hydroxymethyl)aminomethane.

7. The conductive composition of claim 2, wherein the compound (D) is 2-amino-2-methyl-1,3-propanediol.

8. The conductive composition of claim 2, wherein the compound (D) is 2-amino-2-ethyl-1,3-propanediol.

9. The conductive composition of claim 2, wherein the compound (D) is 3[N-tris(hydroxymethyl)methylamino]-2-hydroxypropane-sulfonic acid.

10. The conductive composition of claim 2, wherein the compound (D) is N-tris(hydroxymethyl)methyl-2-aminoethanesulfonic acid.

11. A conductor comprising the conductive composition of claim 1.

12. A solid electrolytic capacitor comprising the conductive composition of claim 1.

13. The conductive composition of claim 1, wherein the compound (D) is 2-amino-1,3-propanediol.

14. The conductive composition of claim 1, wherein the compound (D) is tris(hydroxymethyl)aminomethane.

15. The conductive composition of claim 1, wherein the compound (D) is 2-amino-2-methyl-1,3-propanediol.

16. The conductive composition of claim 1, wherein the compound (D) is 2-amino-2-ethyl-1,3-propanediol.

17. The conductive composition of claim 1, wherein the compound (D) is 3[N-tris(hydroxymethyl)methylamino]-2-hydroxypropane-sulfonic acid.

18. The conductive composition of claim 1, wherein the compound (D) is N-tris(hydroxymethyl)methyl-2-aminoethanesulfonic acid.

* * * * *